(12) United States Patent
Takeuchi et al.

(10) Patent No.: US 6,211,853 B1
(45) Date of Patent: Apr. 3, 2001

(54) OPTICAL WAVEGUIDE DISPLAY WITH VOLTAGE-MODULATED CONTROLLED MOVABLE ACTUATORS WHICH CAUSE LIGHT LEAKAGE IN WAVEGUIDE AT EACH DISPLAY ELEMENT TO PROVIDE GRADATION IN A DISPLAY IMAGE

(75) Inventors: Yukihisa Takeuchi, Nishikamo-gun; Tsutomu Nanataki, Toyoake; Iwao Ohwada, Nagoya; Takayoshi Akao, Kasugai, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 08/991,589

(22) Filed: Dec. 15, 1997

(30) Foreign Application Priority Data

Dec. 16, 1996 (JP) .................................................. 8-335876
Mar. 14, 1997 (JP) .................................................. 9-060667
Jun. 30, 1997 (JP) .................................................. 9-175016
Nov. 6, 1997 (JP) .................................................. 9-304634

(51) Int. Cl.$^7$ ............................. G09G 3/34; G09G 5/10; G02B 26/00; G02B 6/26
(52) U.S. Cl. ........................ 345/108; 345/147; 345/85; 359/295; 385/19; 385/901
(58) Field of Search ................. 345/84, 85, 102, 345/108, 147; 385/1–10, 25, 30, 40, 41, 42, 901, 129–133; 310/311, 328, 330, 331, 332; 359/290–297

(56) References Cited

U.S. PATENT DOCUMENTS

| 2,565,514 | 8/1951 | Pajes | 359/291 |
|---|---|---|---|
| 2,997,922 | 8/1961 | Kaprelian | 359/833 |
| 3,376,092 | 4/1968 | Kushner et al. | 345/85 |
| 3,698,793 | * 10/1972 | Tellerman | 345/108 |
| 3,871,747 | * 3/1975 | Andrews | 385/147 |
| 4,087,810 | * 5/1978 | Hung et al. | 359/291 |
| 4,113,360 | 9/1978 | Baur et al. | 359/196 |
| 4,441,791 | * 4/1984 | Hornbeck | 359/295 |
| 5,106,181 | * 4/1992 | Rockwell, III | 385/2 |
| 5,210,455 | * 5/1993 | Takeuchi et al. | 310/328 |
| 5,319,491 | 6/1994 | Selbrede | 359/291 |
| 5,600,197 | * 2/1997 | Takeuchi et al. | 310/328 |
| 5,613,022 | * 3/1997 | Odhner et al. | 385/147 |
| 5,636,072 | 6/1997 | Shibata et al. | 359/896 |
| 5,664,032 | * 9/1997 | Bischel et al. | 385/4 |
| 5,760,755 | * 6/1998 | Engle | 345/85 |
| 5,771,321 | * 6/1998 | Stern | 385/25 |
| 5,774,252 | * 6/1998 | Lin et al. | 359/295 |
| 5,862,275 | * 1/1999 | Takeuchi et al. | 345/85 |
| 5,953,469 | 9/1999 | Zhou | 385/22 |

FOREIGN PATENT DOCUMENTS

| 0 039 883 | 11/1981 | (EP) . |
|---|---|---|
| 0 675 477 A1 | 3/1995 | (EP) . |
| 0 675 477 A1 | 10/1995 | (EP) . |

* cited by examiner

Primary Examiner—Steven Saras
Assistant Examiner—Paul A. Bell
(74) Attorney, Agent, or Firm—Burr & Brown

(57) ABSTRACT

Disclosed is a display device comprising an optical waveguide plate for introducing light radiated from a light source thereinto, in which the display gradation is controlled by changing the entering amount into an evanescent region existing around the back surface of the optical waveguide plate. In the present invention, an actuator element is provided, which makes bending displacement in a direction to make approach to the optical waveguide plate in accordance with voltage application to a pair of electrodes. A plate member of a displacement-transmitting section for determining the picture element area is provided on the actuator element. The entering amount of the plate member into the evanescent region is changed by controlling voltage application to the actuator element so that display gradation of the picture element corresponding to the actuator element is controlled. Accordingly, the time required to perform row scanning is drastically shortened, and it is possible to easily deal with high quality image display.

22 Claims, 21 Drawing Sheets

OPTICAL WAVEGUIDE DISPLAY WITH VOLTAGE-MODULATED CONTROLLED MOVABLE ACTUATORS WHICH CAUSE LIGHT LEAKAGE IN WAVEGUIDE AT EACH DISPLAY ELEMENT TO PROVIDE GRADATION IN A DISPLAY IMAGE

BACKGROUND OF THE INVENTION

1 Field of the Invention

The present invention relates to a display device which consumes less electric power, and which has large screen brightness. In particular, the present invention relates to a display device which is preferable to be used for display units for displaying a picture image corresponding to an image signal on an optical waveguide plate by controlling leakage light at a predetermined position on the optical waveguide plate by controlling the displacement action of an actuator element in a direction to make contact or separation with respect to the optical waveguide plate in accordance with the attribute of the image signal to be inputted.

2. Description of the Related Art

Those hitherto known as the display device include, for example, cathode ray tubes (CRT), liquid crystal display devices, and plasma displays.

Those known as the cathode ray tube include, for example, ordinary television receivers and monitor units for computers. Although the cathode ray tube has a bright screen, it consumes a large amount of electric power. Further, the cathode ray tube involves a problem that the depth of the entire display device is large as compared with the size of the screen. Further, for example, the cathode ray tube involves drawbacks in that the resolution is decreased in the circumferential areas of a display image, the image or the graphic is distorted, there is no memory function, and it is impossible to present a display in a large scale.

The reason for the foregoing phenomenon is as follows. That is, in the case of the cathode ray tube, the electron beam emitted from the electron gun is greatly deflected. Therefore, the light emission point (beam spot) is expanded at portions at which the electron beam reaches the fluorescent screen of the Braun tube in an inclined manner, and thus the image is displayed in an inclined manner. For this reason, strain occurs on the display image. Moreover, there is a limit for the maintenance to keep a large space at the inside of a Braun tube to be in a vacuum.

On the other hand, the liquid crystal display device is advantageous in that the entire device can be miniaturized, and the display device consumes a small amount of electric power. However, the liquid crystal display device involves problems in that it is inferior in screen brightness, and the field angle of the screen is narrow. Further, since gradational expression is made in accordance with the voltage level, there is a drawback that the arrangement of the driving circuit becomes extremely complicated.

For example, when a digital data line is used, its driving circuit comprises a latch circuit for retaining component RGB data (each 8 bit) for a predetermined period, a voltage selector, a multiplexer for making change to provide voltage levels of the type corresponding to the number of gradations, and an output circuit for adding output data from the multiplexer to the digital data line. In this case, when the number of gradations becomes large, it is necessary for the multiplexer to perform the switching operation at an extremely large number of levels, in accordance with which the circuit arrangement becomes complicated.

When an analog data line is used, its driving circuit comprises a shift register for aligning, in the horizontal direction, component RGB data (each 8 bit) inputted successively, a latch circuit for holding parallel data from the shift register for a predetermined period, a level shifter for adjusting the voltage level, a D/A converter for converting output data from the level shifter into an analog signal, and an output circuit for adding the output signal from the D/A converter to the analog data line. In this case, an operational amplifier is used in the D/A converter. Thus, a predetermined voltage corresponding to the gradation is obtained. However, when the range of gradation becomes wide, it is necessary to use an operational amplifier which outputs a highly accurate voltage. Therefore, such a system involves a drawback that the structure becomes complicated, and the price also becomes high.

Since the plasma display has a small volume of its display section in the same manner as the liquid crystal display device the plasma display is advantageous in that it can be miniaturized, and it is easy to recognize the image because it has a flat display screen. Especially, the alternating current type plasma display additionally has an advantage that no refresh memory is required owing to the memory function of the cell.

By the way, in the case of the plasma display described above, in order to allow the cell to possess the memory function, it is necessary that the polarity of applied voltage is changed in an alternating manner so that the discharge is continued. For this reason, it is necessary for the driving circuit to comprise a first pulse generator for generating a sustain pulse in the X direction and a second pulse generator for generating a sustain pulse in the Y direction. For this reason, a problem arises in that the arrangement of the driving circuit is inevitably complicated. Further, it takes a long time to perform row scanning. Therefore, it is difficult to perform high speed scanning, and it is difficult to deal with high quality image display.

SUMMARY OF THE INVENTION

The present invention has been made in consideration of such problems, an object of which is to provide a display device in which the time required to perform row scanning can be shortened drastically, and it is possible to easily deal with high quality image display.

Another object of the present invention is to provide a display device in which, in addition to the foregoing requirement, it is unnecessary to perform, for example, complicated voltage change and voltage selection even when the range of display gradation is widened, it is possible to restrain the number of settings of the use of voltage to the minimum, and it is possible to realize a simplified arrangement of a peripheral circuit system (including a driving circuit).

Still another object of the present invention is to provide a display device in which it is possible to exhibit the function as the display by utilizing, at the maximum, the memory function of a shape-retaining layer (piezoelectric/electrostrictive layer and anti-ferroelectric layer) of an actuator element for constructing a picture element (image pixel), and it is possible to realize stabilization of light emission and stabilization of display brightness (gradation).

Still another object of the present invention is to provide a display device in which the selection period for a picture element is minimized to make it possible to effectively reduce electric power consumption.

According to the present invention, in order to solve the problems as described above, there is provided a display device comprising an optical waveguide plate for introducing light radiated from a light source thereinto, and a driving section for controlling display gradation by changing an entering amount into an evanescent region which exists around a first principal surface of the optical waveguide plate.

According to the present invention, all of the light, which is introduced, for example, from a lateral end of the optical waveguide plate, is totally reflected at the inside of the optical waveguide plate without being transmitted through front and back surfaces thereof (light-off state) by controlling the magnitude of the refractive index of the optical waveguide plate. When any object (for example, a light-scattering object) contacts with the first principal surface of the optical waveguide plate at a distance of not more than the wavelength of light, then the light, which has once arrived at the surface of the object, is reflected by the surface of the object, and it behaves as scattered light. A part of the scattered light is reflected again in the optical waveguide plate. However, almost all of the scattered light is transmitted through the front surface of the optical waveguide plate without being reflected by the optical waveguide plate (light emission state).

In this state, the region (evanescent region) brought about by the discharge of light (evanescent wave) exists around the first principal surface of the optical waveguide plate. The light energy in this evanescent region (evanescent wave energy) becomes large, as the object approaches the boundary surface between the optical waveguide plate and the external space, and the light energy is exponentially attenuated, as the object is separated from the boundary surface.

When the object (light-scattering object or the like) is allowed to enter the evanescent region, the light emission amount (brightness) is increased in accordance with the increase of the entering amount. That is, the display gradation can be controlled by changing the entering amount into the evanescent region.

In the present invention, it is sufficient to only move the object in the direction to make approach and separation with respect to the optical waveguide plate at the point of time to start display of an image. Accordingly, it is possible to drastically reduce the time required to perform row scanning, and it is possible to easily deal with high quality image display.

In a preferred embodiment, the driving section is provided with actuator elements arranged opposingly to the first principal surface of the optical waveguide plate, and having a number corresponding to a large number of picture elements; wherein a picture image corresponding to an image signal is displayed on the optical waveguide plate, by controlling leakage light at a predetermined portion of the optical waveguide plate by controlling displacement action of each of the actuator elements in a direction to make contact or separation with respect to the optical waveguide plate in accordance with an attribute of the image signal to be inputted. In another aspect, the display device according to the present invention may comprise an optical waveguide plate for introducing light thereinto, a large number of actuator elements provided opposingly to one plate surface of the optical waveguide plate and disposed corresponding to a large number of picture elements, a displacement-transmitting section for transmitting displacement action of the actuator element to the optical waveguide plate, and a driving section for controlling display gradation by changing a contact area and a contact property of the displacement-transmitting section in accordance with the displacement action performed by the actuator element.

In this embodiment, when the actuator element makes displacement in the first direction by the aid of the driving section, and the displacement-transmitting section approaches the first principal surface of the optical waveguide plate, then in general, a part of the surface (the surface opposing to the first principal surface of the optical waveguide plate) of the displacement-transmitting section contacts with the first principal surface of the optical waveguide plate, and the contact area between the optical waveguide plate and the surface of the displacement-transmitting section is increased in accordance with the increase of the displacement amount of the actuator element. When the area of the contact portion is increased, then the amount of light (scattered light), which is reflected by the surface of the displacement-transmitting section, is increased, and the brightness level of the picture element corresponding to the actuator element becomes high. On the contrary, when the displacement amount of the actuator element is decreased by the driving section, and the displacement-transmitting section is separated from the optical waveguide plate, then the brightness level of the picture element is decreased depending on the width of separation. In other words, the display gradation for the picture element can be controlled by means of the displacement operation effected for the actuator element by the driving section.

It is preferable in the inventions described above that the display device comprises a first driving circuit for selecting the actuator element at least in one row unit, a second driving circuit for outputting display information for a selected row, and a signal control circuit for controlling the first and second driving circuits; wherein the first and second driving circuits are controlled so that gradation is controlled at least by means of the voltage modulation system by using the signal control circuit.

Accordingly, owing to the control performed by the signal control circuit, the first driving circuit selects the actuator element (picture element) at least in one row unit, and the second driving circuit outputs display information to each of the picture elements on a selected row (row subjected to the selection). At this time, the first and second driving circuits are controlled by the aid of the signal control circuit so that the display given by each of the picture elements is expressed in gradation at least in accordance with the voltage modulation system.

In the present invention, it is desirable that the first and second driving circuits have the following features.

(1) The actuator element undergoes the capacitive load. Therefore, considering the fact that the capacitive load is subjected to the driving, it is desirable that the partial voltage ratio, which is applied to the capacitive load, is not less than 50%, for example, at the time of completion of voltage (ON voltage) application for allowing the actuator element to make the bending displacement.

(2) In order to obtain a displacement amount of the actuator element which makes it possible to express the ON state and the OFF state of the picture element, it is desirable that a voltage output of not less than 20 V can be provided.

(3) It is desirable to consider the fact that the direction of the output current is recognized to be bidirectional.

(4) It is desirable that the load concerning the two-electrode structure in the row direction and the column direction can be subjected to the driving.

It is desirable for the display device constructed as described above that the actuator element comprises a shape-retaining layer, an operating section having at least a pair of electrodes formed on the shape-retaining layer, a vibrating section for supporting the operating section, and a fixed section for supporting the vibrating section in a vibrating manner, wherein the driving section comprises a displacement-transmitting section for transmitting the displacement action of the actuator element to the optical waveguide plate, the displacement action being generated by voltage application to the pair of electrodes.

In the present invention, the term "actuator element having the shape-retaining layer" indicates an actuator element which has at least two or more displacement states at an identical voltage level.

Accordingly, all of the light, which is introduced, for example, from the end of the optical waveguide plate, is totally reflected at the inside of the optical waveguide plate without being transmitted through the front and back surfaces of the optical waveguide plate (OFF state), by regulating the magnitude of the refractive index of the optical waveguide plate. In this state, when the displacement-transmitting section contacts with the first principal surface of the optical waveguide plate at a distance of not more than the wavelength of the light, then the light, which has once reached the surface of the displacement-transmitting section, is reflected by the surface of the displacement-transmitting section, and the light behaves as scattered light. A part of the scattered light is reflected again at the inside of the optical waveguide plate. However, almost all of the scattered light is not reflected by the optical waveguide plate, and the light is transmitted through the front surface of the optical waveguide plate (ON state).

As described above, it is possible to control the presence or absence of light emission (leakage light) at the front surface of the optical waveguide plate, depending on the presence or absence of the contact of the displacement-transmitting section disposed at the back of the optical waveguide plate. In this case, one unit for allowing the displacement-transmitting section to make displacement action in the direction to give contact or separation with respect to the optical waveguide plate may be regarded as one picture element. Thus, a picture image (for example, characters and graphics) corresponding to an image signal can be displayed on the front surface of the optical waveguide plate in the same manner as the cathode ray tube and the liquid crystal display device, by arranging a large number of such picture elements in a matrix form, and controlling the displacement action of each of the picture elements in accordance with an attribute of the inputted image signal.

The actuator element having the shape-retaining layer has the following features.

(1) The threshold characteristic concerning the change from the OFF state to the ON state is steep as compared with the case in which no shape-retaining layer exists. Accordingly, it is possible to narrow the deflection width of the voltage, and it is possible to mitigate the load on the circuit.

(2) The difference between the ON state and the OFF state is distinct, resulting in improvement in contrast.

(3) The dispersion of threshold value is decreased, and an enough margin is provided for the voltage setting range.

It is desirable to use, as the actuator element, an actuator element which makes, for example, upward displacement (giving the separated state upon no voltage load and giving the contact state upon voltage application) because of easiness of control. Especially, it is desirable to use an actuator element having a structure including a pair of electrodes on its surface. It is preferable to use, for example, a piezoelectric/electrostrictive layer and an anti-ferroelectric layer as the shape-retaining layer.

In the display device constructed as described above, it is preferable that the voltage, which is applied by the aid of the second driving circuit, is subjected to analog control depending on display gradation by using the signal control circuit upon selection for the actuator element.

Especially, when a still image is displayed on a display surface of the optical waveguide plate, it is preferable that a refresh voltage, which is subjected to analog adjustment in accordance with a display image, is applied to each of the actuator elements by the aid of the second driving circuit upon completion of a minimum still image display period.

In this embodiment, the periodical application of the refresh voltage to each of the actuator elements restores the displacement state of each of the actuator elements to its gradational level. Therefore, it is possible to maintain the display of the still image for a period not shorter than the minimum still image display period. Accordingly, the display device of the present invention is preferably used, for example, for a so-called electronic poster as one of examples of application of the still image display.

In another embodiment, it is preferable that upon selection for the actuator element, a number of times of application of minute pulse signals applied by the aid of the second driving circuit is changed in accordance with display gradation by using the signal control circuit.

In this embodiment, it is sufficient to only apply the minute pulse signal to the actuator element in an amount corresponding to its gradation upon the point of time to start image display. Accordingly, it is possible to perform row scanning at an extremely high speed. Thus, it is possible to easily deal with high quality image display.

Especially, it is unnecessary to use any D/A converter which would be otherwise used to convert digital data into an analog signal. Moreover, it is unnecessary to perform, for example, any complicated voltage change and voltage selection, even when the range of display gradation is widened. Therefore, it is possible to suppress, to the minimum, the number of settings of the voltage to be used. Thus, it is possible to realize simplification of the arrangement of the peripheral circuit system (including the driving circuit).

It is preferable that a pulse width and/or an amplitude of the minute pulse signal is set while considering maximum display gradation. Alternatively, it is preferable that a pulse width and/or an amplitude of the minute pulse signal is set depending on a wavelength of the light introduced into the optical waveguide plate.

In another embodiment, it is preferable that an angle of incidence of the light with respect to the optical waveguide plate is set depending on a wavelength of the light introduced into the optical waveguide plate.

In general, the depth of the evanescent region (the depth at which the energy value of the evanescent wave is at the boundary between the optical waveguide plate and the external space) is increased in accordance with the increase of the wavelength of the light, while the depth of the evanescent region is decreased in accordance with the increase of the angle of incidence of light with respect to the optical waveguide plate. According to this fact, assuming that red, green, and blue light fluxes are introduced from a light source, the respective light fluxes have different wavelengths. Therefore, the respective light fluxes have different depths of the evanescent region and different energy distributions of the evanescent wave.

However, in the present invention, the angle of incidence is changed depending on the wavelength of light introduced into the optical waveguide plate. Therefore, it is possible to obtain an approximately identical energy distribution of the evanescent wave for the respective light fluxes. Thus, it is possible to effectively correct dispersion of brightness among the respective light fluxes.

When a still image is displayed on a display surface of the optical waveguide plate, it is preferable that a refresh pulse comprising at least one of the minute pulse signals is applied to each of the actuator elements by the aid of the second driving circuit upon completion of the minimum still image display period.

In this embodiment, the periodical application of the refresh pulse to each of the actuator elements restores the displacement state of each of the actuator elements to its gradational level. Therefore, it is possible to maintain the display of the still image for a period not shorter than the minimum still image display period. Accordingly, the display device of the present invention is preferably used, for example, for a so-called electronic poster as one of examples of application of the still image display.

In another embodiment, when an animation image is displayed on a display surface of the optical waveguide plate, it is preferable that assuming that a period to display one image of the animation image is one field, a reset voltage, which is sufficient to reset displacement of the actuator element, is applied by the aid of the second driving circuit upon completion of each field.

In this embodiment, only the following operation is performed. That is, the minute pulse signal is applied in a number of times corresponding to the gradation at the point of time at which one field is started, and the reset voltage is applied upon the point of time at which one field is completed. It is unnecessary to apply any voltage or the like to the actuator element during the period between the start and the completion. Therefore, it is possible to greatly reduce electric power consumption required to drive the actuator element, and it is possible to provide enough time for signal processing. Thus, it is possible to easily respond to evolution to more high speed processing, for example, display of high-definition television images and display of computer graphics.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Illustrative embodiments of the display device according to the present invention (hereinafter simply referred to as "display device according to the embodiment") will be described below with reference to FIGS. 1 to 21.

Figure 1:
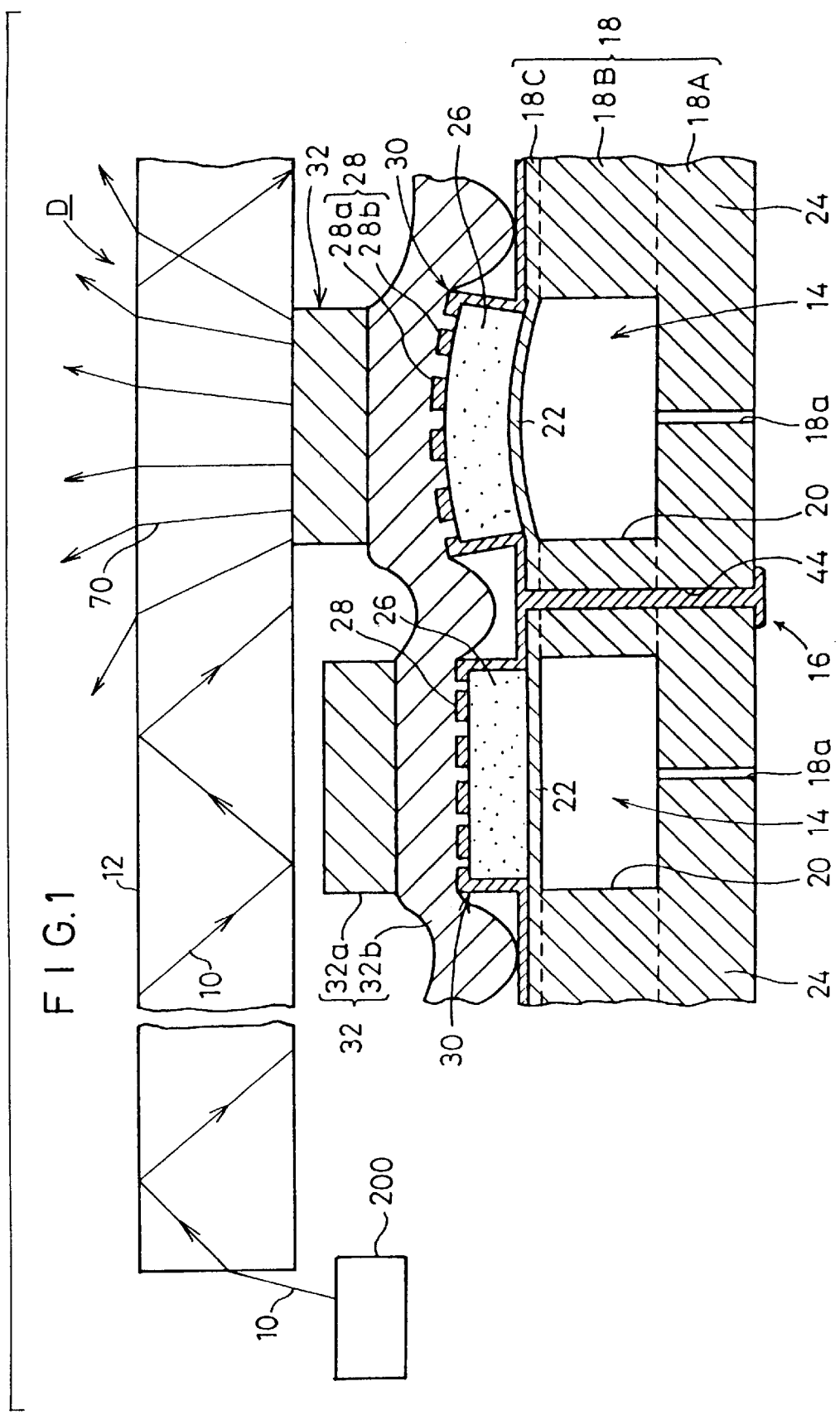
FIG. 1 shows a cross-sectional arrangement illustrating a display device according to an embodiment of the present invention.

As shown in FIG. 1, a display device D according to the this embodiment comprises an optical waveguide plate 12 for introducing light 10 radiated from a light source 200 thereinto, and a driving section 16 provided oppositely to the back surface of the optical waveguide plate 12 and including a large number of actuator elements 14 which are arranged corresponding to picture elements (image pixels). The driving section 16 includes a substrate 18 composed of, for example, a ceramic. The actuator elements 14 are arranged at positions corresponding to the respective picture elements on the substrate 18. The substrate 18 has its first principal surface which is arranged to oppose to the back surface of the optical waveguide plate 12. The first principal surface is a continuous surface (flushed surface). Hollow spaces 20 for forming respective vibrating sections as described later on are provided at positions corresponding to the respective picture elements at the inside of the substrate 18. The respective hollow spaces 20 communicate with the outside via through holes 18a each having a small diameter and provided at a second principal surface of the substrate 18.

The portion of the substrate 18, at which the hollow space 20 is formed, is thin-walled. The other portion of the substrate 18 is thick-walled. The thin-walled portion has a structure which tends to undergo vibration in response to external stress, and it functions as a vibrating section 22. The portion other than the hollow space 20 is thick-walled, and it functions as a fixed section 24 for supporting the vibrating section 22.

That is, the substrate 18 has a stacked structure comprising a substrate layer 18A as a lowermost layer, a spacer layer 18B as an intermediate layer, and a thin plate layer 18C as an uppermost layer. The substrate 18 can be recognized as an integrated structure including the hollow spaces 20 formed at the positions in the spacer layer 18B corresponding to the picture elements. The substrate layer 18A functions as a substrate for reinforcement, as well as it functions as a substrate for wiring. The substrate 18 may be sintered in an integrated manner, or it may be additionally attached.

As shown in FIG. 1, each of the actuator elements 14 comprises the vibrating section 22 and the fixed section 24 described above, as well as a main actuator element 30 including a shape-retaining layer 26 composed of, for example, a piezoelectric/electrostrictive layer or an antiferroelectric layer directly formed on the vibrating section 22 and a pair of electrodes 28 (a row electrode 28a and a column electrode 28b) formed on an upper surface of the shape-retaining layer 26, and a displacement-transmitting section 32 connected onto the main actuator element 30 as shown in FIG. 1, for increasing the contact area with respect to the optical waveguide plate 12 to obtain an area corresponding to the picture element.

That is, the display device D has the structure in which the main actuator elements 30 comprising the shape-retaining layers 26 and the pairs of electrodes 28 are formed on the substrate 18. The pair of electrodes 28 may have a structure in which they are formed on upper and lower sides of the shape-retaining layer 26, or they are formed on only one side of the shape-retaining layer 26. However, in order to advantageously joint the substrate 18 and the shape-retaining layer 26, it is preferable that the pair of electrodes 28 are formed only on the upper side (the side opposite to the substrate 18) of the shape-retaining layer 26 so that the substrate 18 directly contacts with the shape-retaining layer 26 without any difference in height, as in the display device D.

Figure 2:
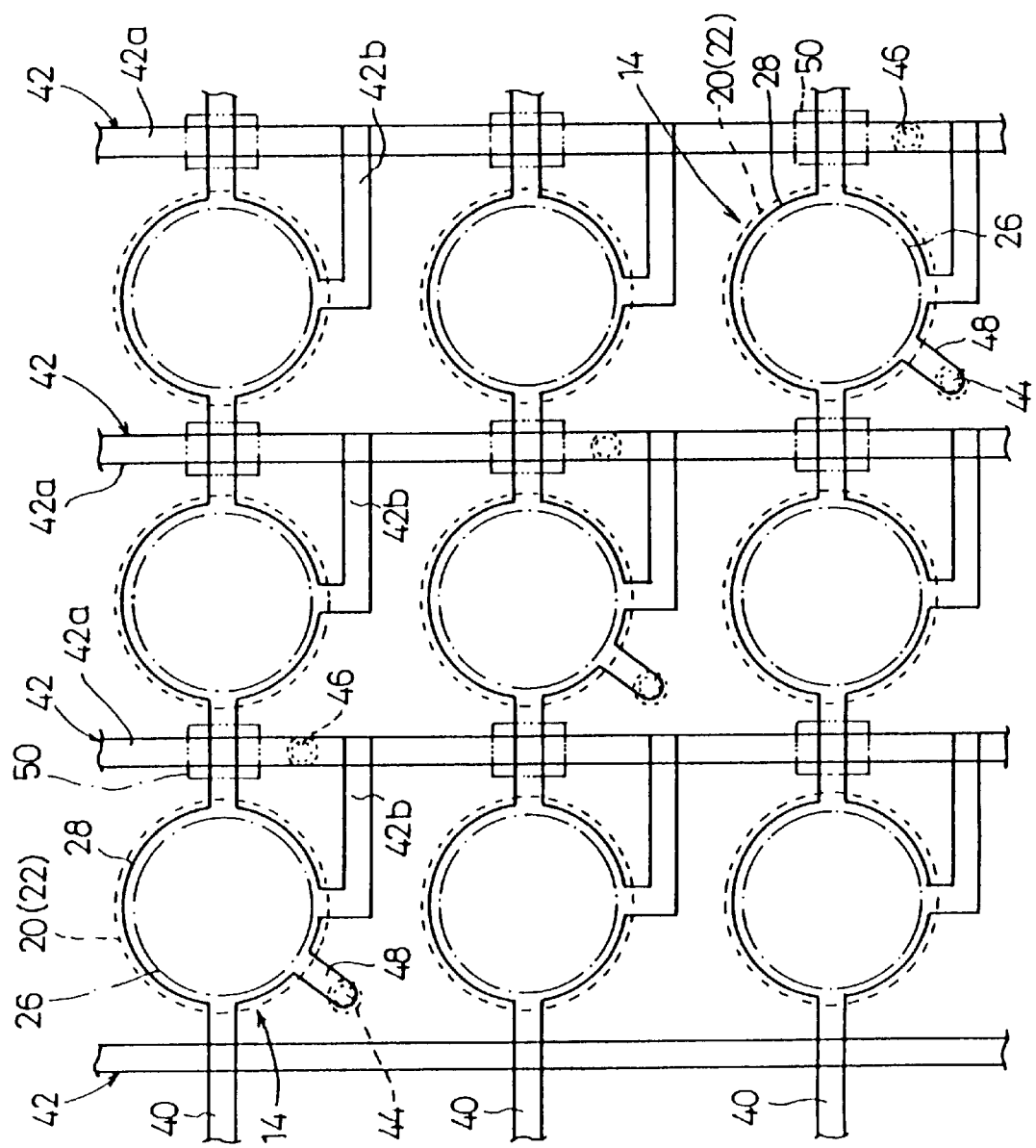
FIG. 2 shows an enlarged plan view illustrating an arrangement of actuator elements (picture elements or image pixels) included in a display device according to an embodiment of the present invention.

The shapes of the respective members will be explained below with reference to FIGS. 2 to 10. At first, as shown in FIG. 2, the hollow space 20, which is formed in the substrate 18, has a circular circumferential superficial configuration, i.e., the vibrating section 22 has a circular planar configuration (see broken lines). The shape-retaining layer 26 has a circular planar configuration (see chain lines). The pair of electrodes 28 form an outer circumferential configuration which is circular as well (see solid lines). In this embodiment, the vibrating section 22 is designed to have the largest size. The outer circumferential configuration of the pair of electrodes 28 is designed to have the second largest size. The planar configuration of the shape-retaining layer 26 is designed to have the smallest size. Alternatively, it is allowable to make design so that the outer circumferential configuration of the pair of electrodes 28 is largest.

Figure 3:
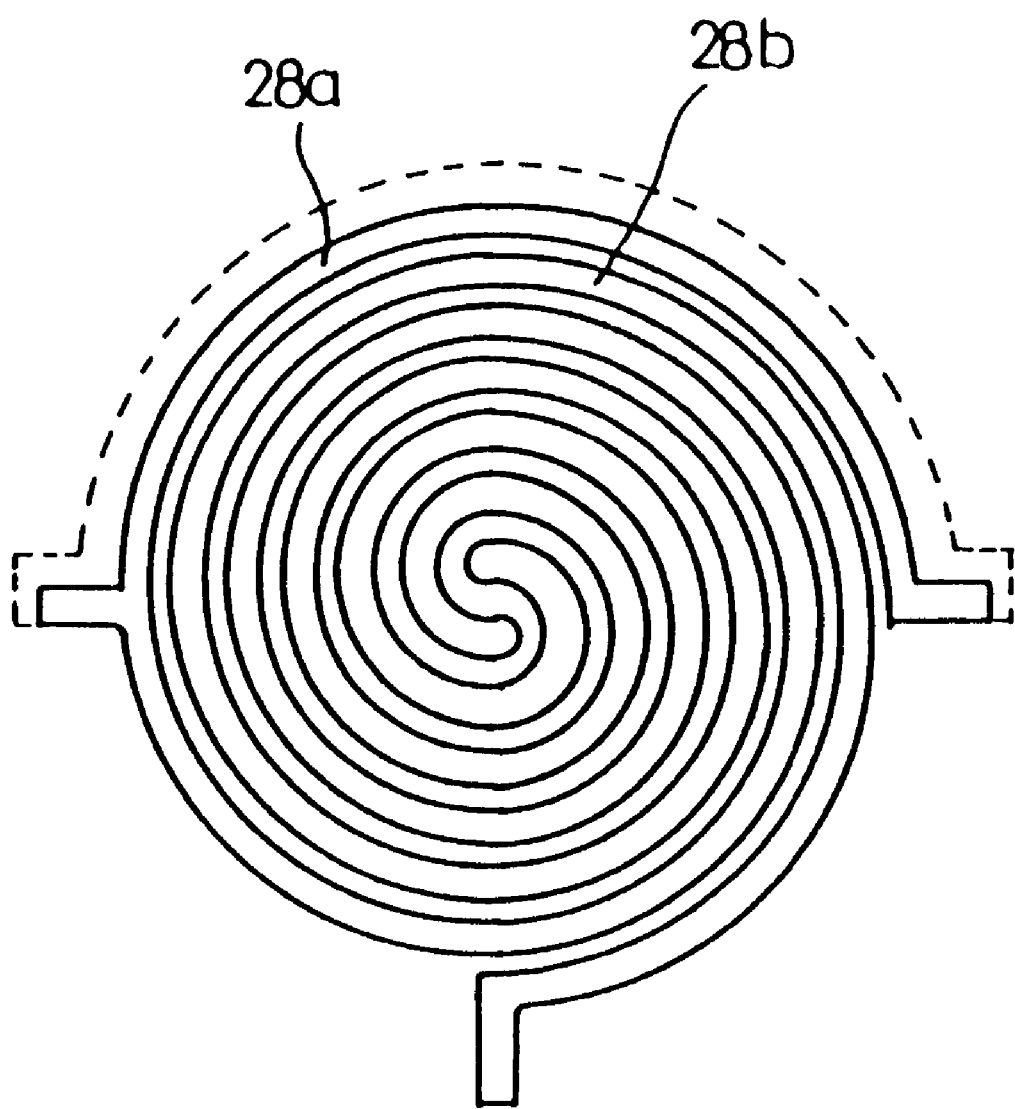
FIG. 3 shows a plan view illustrating a planar configuration (spiral configuration) of a pair of electrodes included in a display device according to an embodiment of the present invention.

The pair of electrodes 28 (row electrodes 28a and column electrodes 28b) formed on the shape-retaining layer 26 have, for example, a spiral planar configuration as shown in FIG. 3, in which the pair of electrodes 28a, 28b are parallel to one another and separated from each other to form a spiral structure composed of several turns. The number of turns of the spiral is actually not less than 5 turns. However, FIG. 3 illustratively shows 3 turns in order to avoid complicated illustration.

As shown in FIG. 2, the wiring arrangement communicating with the respective electrodes 28a, 28b includes vertical selection lines 40 having a number corresponding to a number of rows of a large number of the picture elements, and signal lines 42 having a number corresponding to a number of columns of the large number of the picture elements. Each of the vertical selection lines 40 is electrically connected to the row electrode 28a of each of the picture elements (actuator elements 14, see FIG. 1). Each of the signal lines 42 is electrically connected to the column electrode 28b of each of the picture elements 14. The respective vertical selection lines 40, which are included in one row, are wired in series such that the wiring is led from the row electrode 28a provided for the picture element in the previous column, and then the wiring is connected to the row electrode 28a provided for the picture element in the present column. The signal line 42 comprises a main line 42a extending in the direction of the column, and branch lines 42b branched from the main line 42a and connected to the column electrode 28b of each of the picture elements 14.

The voltage signal is supplied to the respective vertical selection lines 40 from an unillustrated wiring board (stuck to the second principal surface of the substrate 18) via through holes 44. The voltage signal is also supplied to the respective signal lines 42 from the unillustrated wiring board via through holes 46.

Various arrangement patterns may be assumed for the through holes 44, 46. However, in the illustrative arrangement shown in FIG. 2, the through holes 44 for the vertical selection lines 40 are formed as follows provided that the number of rows is M, and the number of columns is N.

In the case of N=M or N>M, the through hole 44 is formed in the vicinity of a picture element in the nth row and nth column (n=1, 2 . . . ) and at a position deviated toward the signal line (main line) in the (n−1)th column. In the case of N<M, the through hole 44 is formed in the vicinity of a picture element in the (αN+n)th row and nth column (α=0, 1 . . . (quotient of M/N−1)) and at a position deviated toward the signal line (main line) in the (n−1)th column.

On the other hand, the through holes 46 for the signal lines 42 are formed as follows. In the case of N=M or N<M, the through hole 46 is formed on the main line 42$a$ of each of the signal lines 42 and at a position adjacent to a picture element in the nth row and nth column (n=1, 2 . . . ). In the case of N>M, the through hole 46 is formed on the main line 42$a$ of each of the signal lines 42 and at a position adjacent to a picture element in the nth row and (βM+n)th column (β=0, 1 . . . (quotient of N/M−1)). The through hole 44 for the vertical selection line 40 is not formed on the vertical selection line 40, unlike the through hole 46 for the signal line 42. Accordingly, a relay conductor 48 is formed between the through hole 44 and the row electrode 28$a$, for making electric continuity therebetween.

Insulative films 50 (shown by two-dot chain lines), each of which is composed of, for example, a silicon oxide film, a glass film, or a resin film, are allowed to intervene at portions of intersection between the respective vertical selection lines 40 and the respective signal lines 42, in order to ensure insulation between the mutual wiring arrangements 40, 42.

Figure 4:
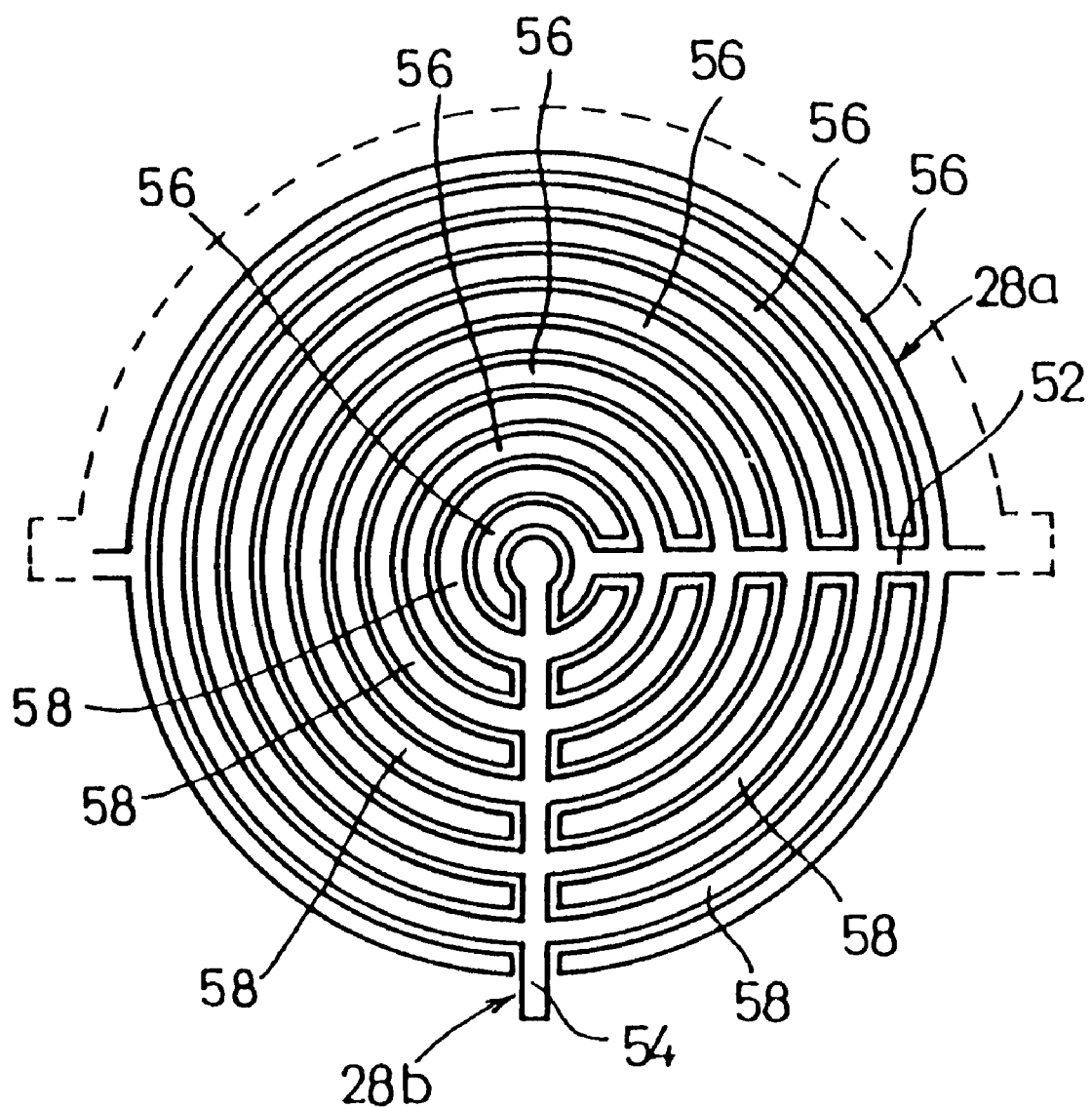
FIG. 4 shows a plan view illustrating a planar configuration (branched configuration) of a pair of electrodes included in a display device according to an embodiment of the present invention.

The planar configuration of the pair of electrodes 28 is not limited to the spiral configuration as shown in FIG. 3. The planar configuration may be a configuration as shown in FIG. 4. Specifically, each of the pair of electrodes 28$a$, 28$b$ has a configuration composed of a trunk 52, 54 which extends toward the center of the shape-retaining layer 26, and a lot of branches 56, 58 branched from the trunk 52, 54. In this configuration, the pair of electrodes 28$a$, 28$b$ are separated from each other and arranged complementarily (hereinafter referred to as "branched configuration" for convenience).

Figure 5:
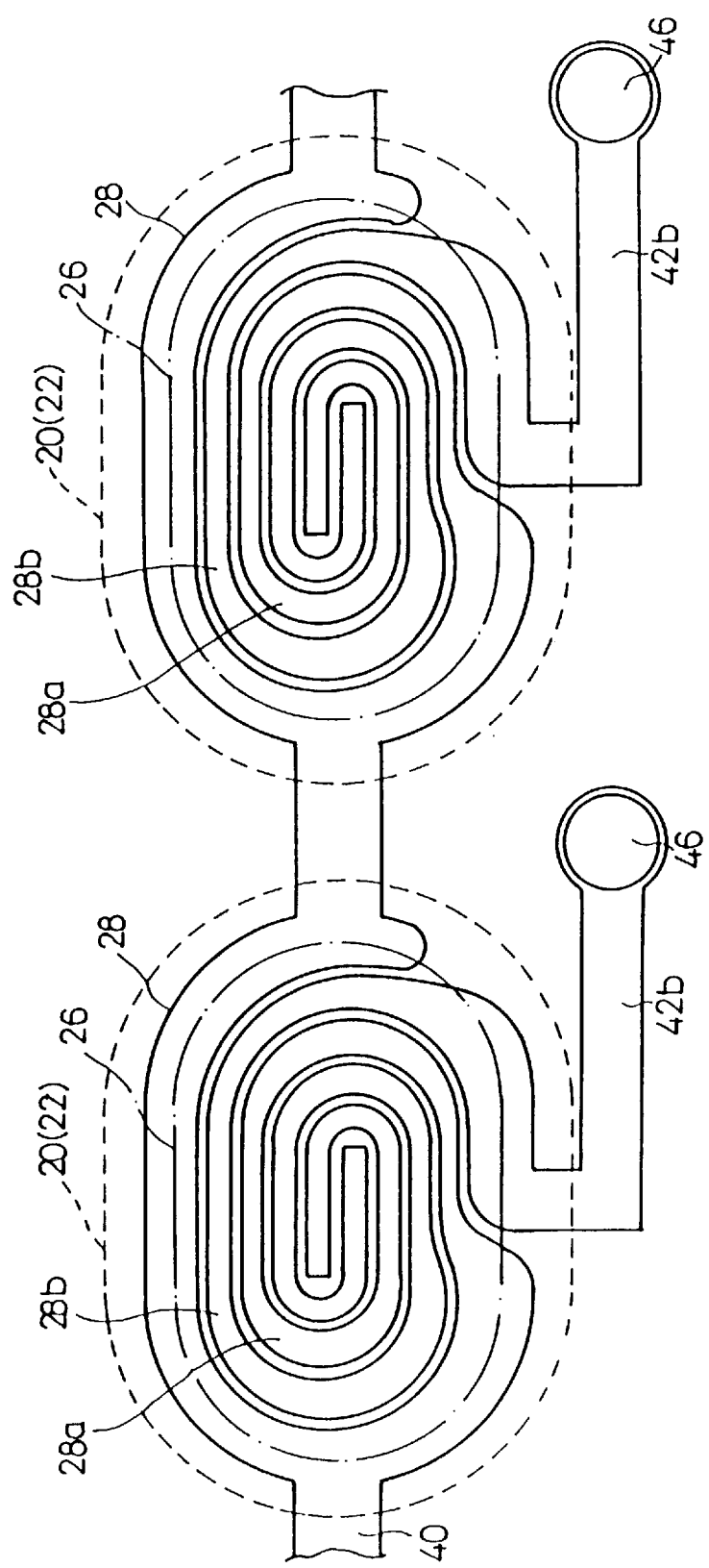
FIG. 5 shows a plan view illustrating a planar configuration (oblong configuration, spiral configuration) of a vibrating section, a shape-retaining layer, and a pair of electrodes included in a display device according to an embodiment of the present invention.
Figure 6:
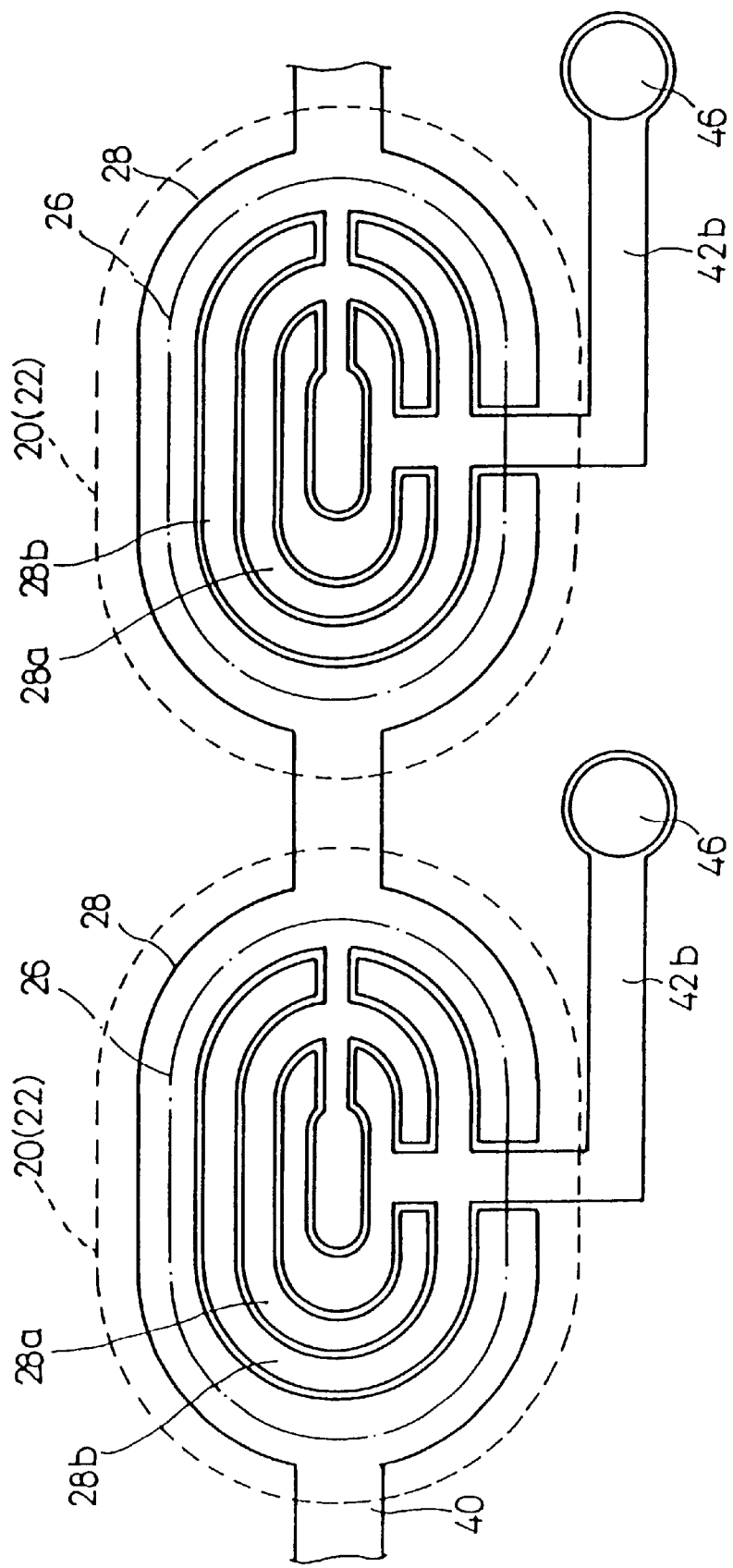
FIG. 6 shows a plan view illustrating a planar configuration (oblong configuration, branched configuration) of a vibrating section, a shape-retaining layer, and a pair of electrodes included in a display device according to an embodiment of the present invention.
Figure 7:
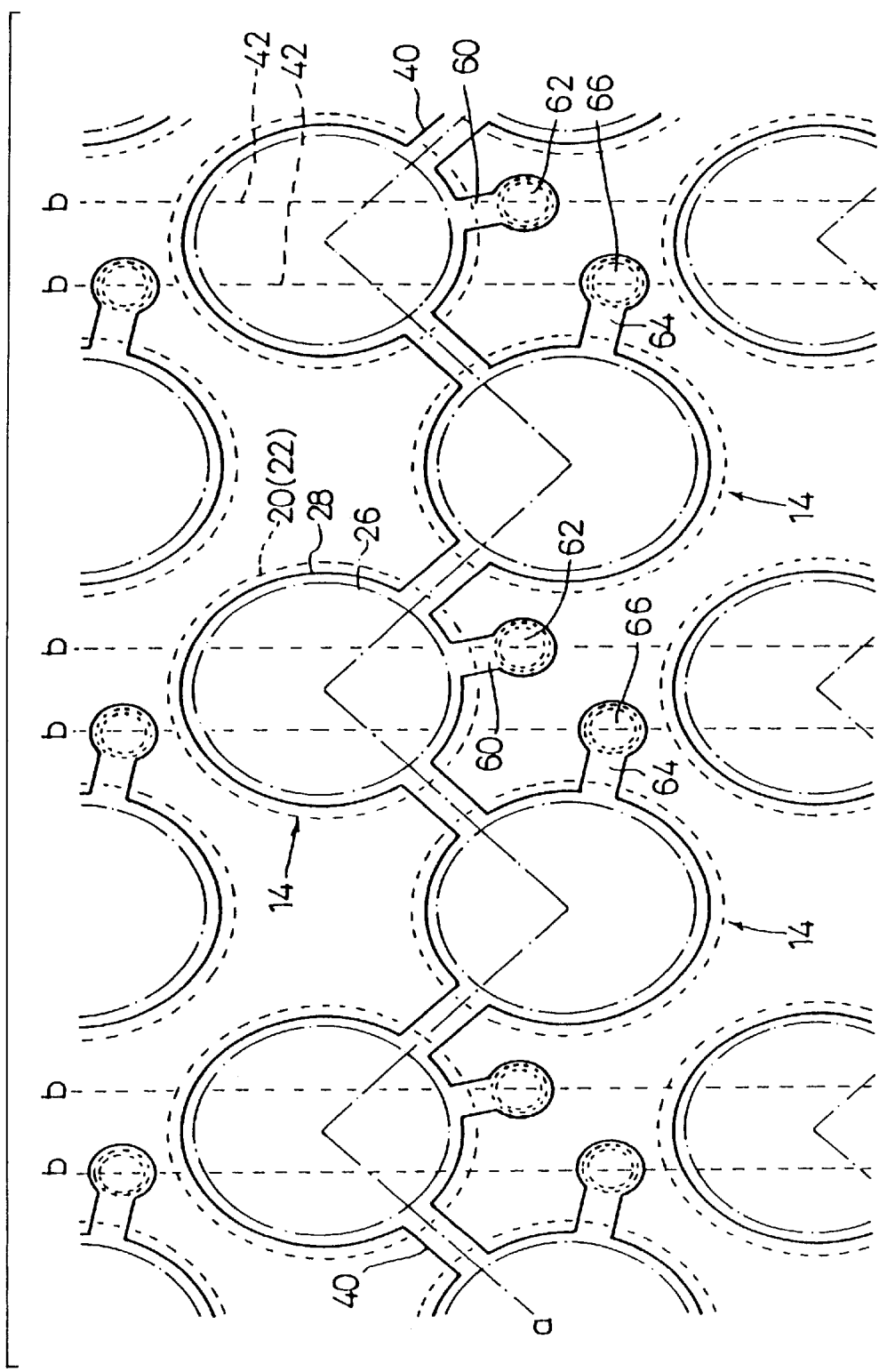
FIG. 7 shows an enlarged plan view illustrating another exemplary arrangement of actuator elements (picture elements) included in a display device according to an embodiment of the present invention.

The display device D constructed as described above has been explained as one having the circular planar configuration of the vibrating section 22, the circular planar configuration of the shape-retaining layer 26, and the circular outer circumferential configuration formed by the pair of electrodes 28. Alternatively, it is also preferable to use oblong configurations (track configurations) as shown in FIGS. 5 and 6, and an elliptic configuration as shown in FIG. 7.

Figure 8:
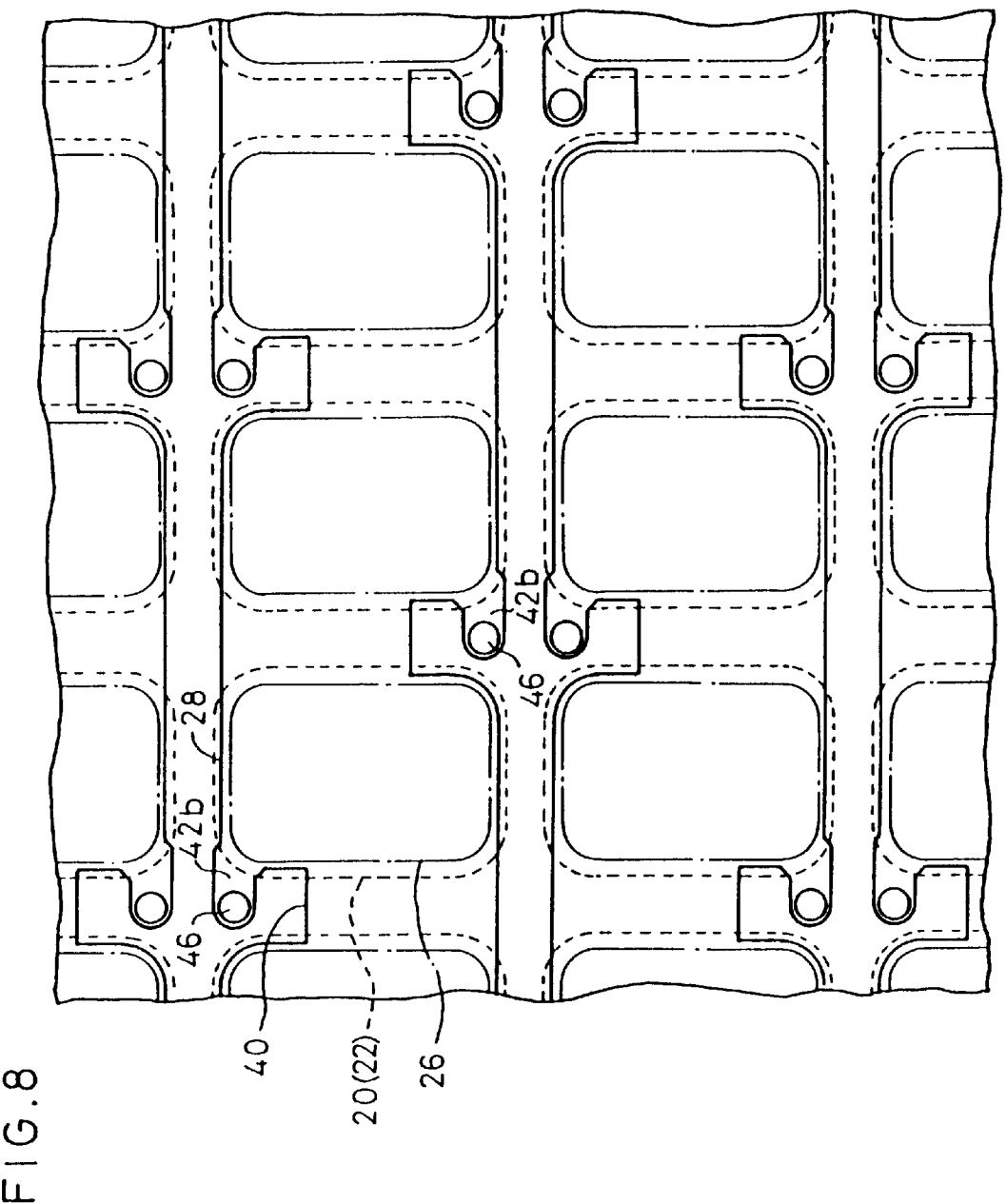
FIG. 8 shows an enlarged plan view illustrating another exemplary arrangement of actuator elements (picture elements) included in a display device according to an embodiment of the present invention.
Figure 9:
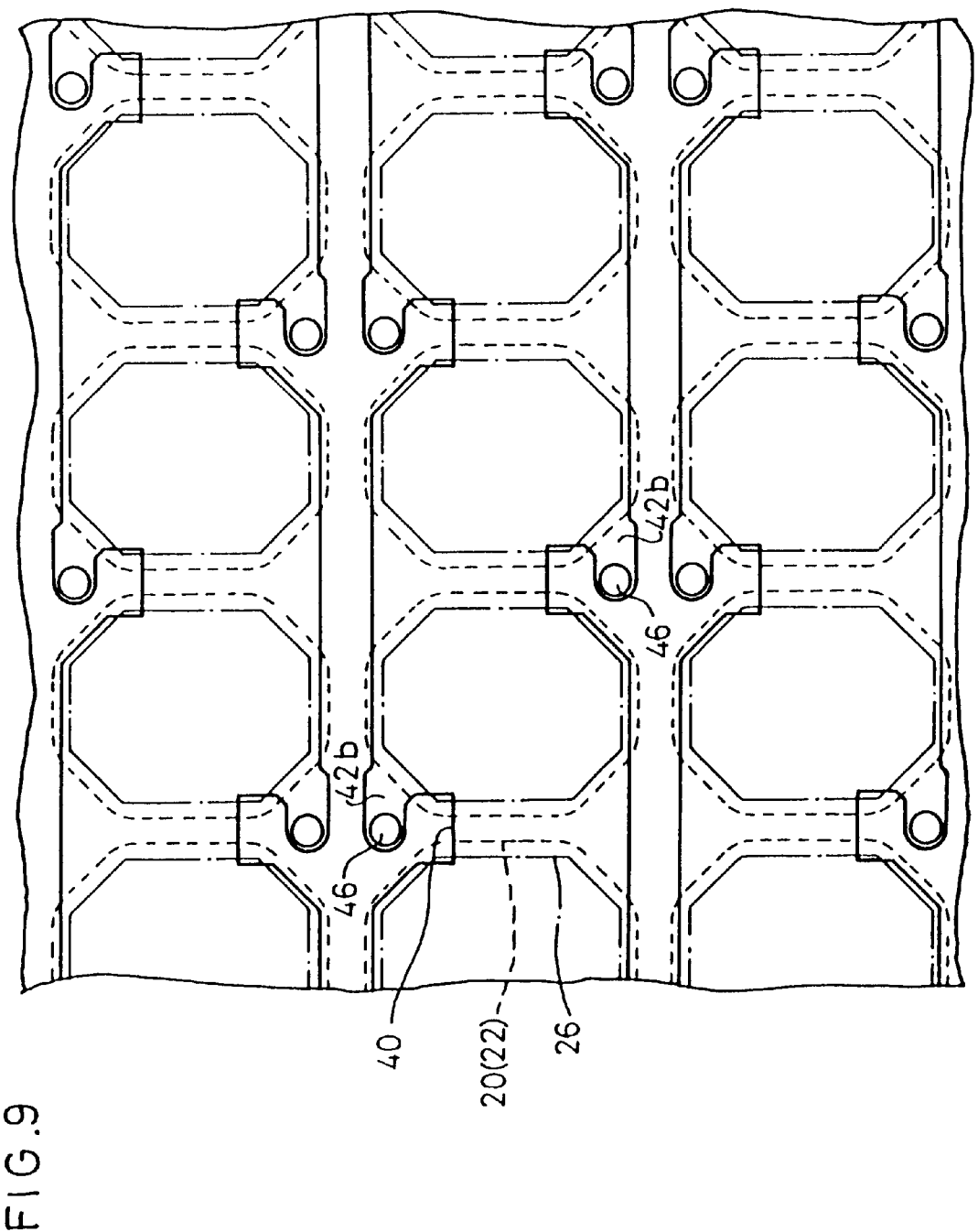
FIG. 9 shows an enlarged plan view illustrating another exemplary arrangement of actuator elements (picture elements) included in a display device according to an embodiment of the present invention.

Further alternatively, both of the planar configuration of the vibrating section 22 and the planar configuration of the shape-retaining layer 26 may be rectangular configurations with smoothed corners as shown in FIG. 8. Further alternatively, both of the planar configuration of the vibrating section 22 and the planar configuration of the shape-retaining layer 26 may be polygonal configurations (for example, octagonal configurations) with respective apex angle portions having rounded shapes as shown in FIG. 9. The configuration of the vibrating section 22, the planar configuration of the shape-retaining layer 26, and the outer circumferential configuration formed by the pair of electrodes 28 may be combinations of circular and elliptic configurations, or combinations of rectangular and elliptic configurations, without any special limitation. Although not shown, those preferably adopted as the planar configuration of the shape-retaining layer 26 include a ring-shaped configuration. In this case, those usable as the outer circumferential configuration include various ones such as circular, elliptic, and rectangular configurations.

The ring-shaped planar configuration of the shape-retaining layer 26 makes it unnecessary to form any electrode on the hollow portion. Therefore, it is possible to decrease the electrostatic capacity without decreasing the displacement amount.

In the illustrative arrangements shown in FIGS. 2, 8, and 9, the respective actuator elements 14 (picture elements) are illustratively arranged in the matrix form on the substrate 18. Alternatively, as shown in FIG. 7, the picture elements (actuator elements) 14 may be arranged in a zigzag form with respect to the respective rows. In the case of the arrangement pattern shown in FIG. 7, the actuator elements (picture elements) 14 are arranged in the zigzag form in relation to the respective rows. Accordingly, the line (indicated by a chain line a) connecting through the vertical selection lines 40 respectively has a zigzag form in relation to each of the rows. The signal lines 42 have a wiring pattern as shown by broken lines b wired on the unillustrated wiring board, in which the picture elements 14 arranged in the zigzag form are divided, for example, into a group of picture elements (actuator elements) 14 located vertically upwardly and a group of picture elements (actuator elements) 14 located vertically downwardly, and two signal lines 42 are wired mutually adjacently at positions corresponding to the former and latter groups of picture elements. In FIG. 7, the picture elements arranged in the zigzag form are wired as follows. Namely, for example, the column electrode 28$b$ of the picture element (actuator element) 14 located vertically upwardly is electrically connected to the right signal line 42 of the mutually adjacent two signal lines 42, 42, via a relay conductor 60 and a through hole 62. The column electrode 28$b$ of the picture element (actuator element) 14 located vertically downwardly is electrically connected to the left signal line 42 of the mutually adjacent two signal lines 42, 42, via a relay conductor 64 and a through hole 66.

Next, the operation of the display device D constructed as described above will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this state, when a certain actuator element 14 is in the selected state, and the displacement-transmitting section 32 corresponding to the actuator element 14 contacts, at a distance of not more than the wavelength of light 10, with the back surface of the optical waveguide plate 42, then the light 10, which has once arrived at the surface of the displacement-transmitting section 32, is reflected by the surface of the displacement-transmitting section 32, and it behaves as scattered light 70. A part of the scattered light 70 is reflected again in the optical waveguide plate 12. However, almost all of the scattered light 70 is not reflected by the optical waveguide plate 12, and it is transmitted through the front surface of the optical waveguide plate 12.

That is, the presence or absence of light emission (leakage light) at the front surface of the optical waveguide plate 12 can be controlled depending on the presence or absence of the contact of the displacement-transmitting section 32 disposed at the back of the optical waveguide plate 12. Especially, in the display device D according to the this embodiment, one unit for making the displacement action of the displacement-transmitting section 32 in the direction to make contact or separation with respect to the optical waveguide plate 12 may be recognized as one picture element. A large number of the picture elements are arranged in a matrix configuration or in a zigzag configuration concerning the respective rows. Therefore, it is possible to display a picture image (characters and graphics) corresponding to the image signal on the front surface of the optical waveguide plate in the same manner as the cathode ray tube, the liquid crystal display device, and the plasma display, by controlling the displacement action in each of the picture elements in accordance with the attribute of the inputted image signal.

The light 10 to be introduced into the optical waveguide plate 12 may be any one of those of ultraviolet, visible, and infrared regions. Those usable as the light source 200 include, for example, incandescent lamp, deuterium discharge lamp, fluorescent lamp, mercury lamp, metal halide lamp, halogen lamp, xenon lamp, tritium lamp, light emitting diode, laser, plasma light source, hot cathode tube, and cold cathode tube.

Figure 10:
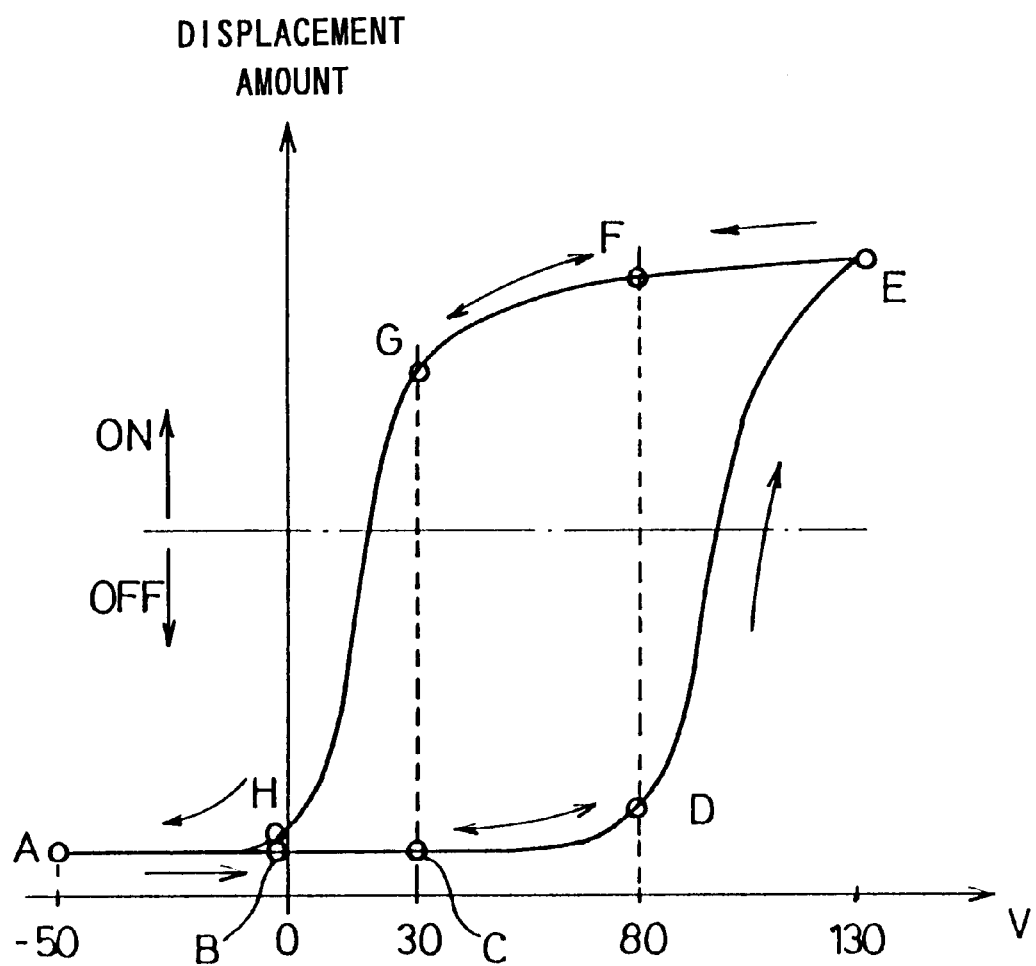
FIG. 10 shows a bending displacement characteristic of the actuator element (picture elements) included in the display device according to the embodiment of the present invention.

Next, the principle of operation effected in the respective actuator elements 14 when the piezoelectric layer is used as the shape-retaining layer 26 will be explained on the basis of the bending displacement characteristic shown in FIG. 10. The bending displacement characteristic shown in FIG. 10 is obtained by applying a voltage between the row electrode 28a and the column electrode 28b of the actuator element 14 to perform a polarization treatment for the shape-retaining layer 26, and then observing the bending displacement of the actuator element 14 while continuously changing the voltage applied to the actuator element 14. In this embodiment, as shown in FIG. 1, the direction of bending displacement is positive when the actuator element 14 makes bending displacement in a first direction (direction to make approach to the optical waveguide plate 12).

The measurement of the bending displacement characteristic will be specifically explained with reference to an example. At first, when a voltage is applied between the row electrode 28a and the column electrode 28b to perform the polarization treatment for the shape-retaining layer 26, an electric field in the positive direction is generated in the superficial direction around the first principal surface of the shape-retaining layer 26. A voltage, which exceeds the range of use of the voltage (Vr to Vh) usable to operate the actuator element 14 of the display device D, is applied, for example, for 7 hours at an appropriate temperature. Thus, the polarization treatment is achieved in the same direction as that of the generated electric field.

After that, the voltage application between the row electrode 28a and the column electrode 28b is stopped to give a no-voltage-loaded state. Simultaneously with the start of measurement, a sine wave having a frequency of 1 Hz, a positive peak voltage of Vh, and a negative peak voltage of Vr is applied between the row electrode 28a and the column electrode 28b of the actuator element 14. The displacement amount is continuously measured at respective points (Point A to Point H) by using a laser displacement meter. FIG. 10 shows a bending displacement characteristic obtained by plotting results of the measurement on a graph of electric field-bending displacement. As indicated by arrows in FIG. 10, the displacement amount of the bending displacement continuously changes in accordance with continuous increase and decrease in applied voltage while providing a certain degree of hysteresis.

Specifically, it is assumed that the measurement is started from a no-voltage-loaded state (applied voltage=0 V) indicated by Point B. At Point B, only a uniform electric field, which is caused by the polarization treatment, is generated in the shape-retaining layer 26. Therefore, no elongation occurs in the shape-retaining layer 26, and the displacement-transmitting section 32 and the optical waveguide plate 12 are in a separated state, i.e., in the OFF state.

Next, when the positive peak voltage (Vh) is applied between the row electrode 28a and the column electrode 28b of the actuator element 14, the actuator element 14 makes bending displacement in the first direction (the direction to make approach to the optical waveguide plate 12) as shown by Point E. The convex displacement of the actuator element 14 allows the displacement-transmitting section 32 to make displacement toward the optical waveguide plate 12, and the displacement-transmitting section 32 contacts with the optical waveguide plate 12.

The displacement-transmitting section 32 contacts with the back surface of the optical waveguide plate 12 in response to the bending displacement of the main actuator element 30. When the displacement-transmitting section 32 contacts with the back surface of the optical waveguide plate 12, for example, the light 10, which has been totally reflected in the optical waveguide plate 12, is transmitted through the back surface of the optical waveguide plate 12, and it is transmitted to the surface of the displacement-transmitting section 32. The light 10 is reflected by the surface of the displacement-transmitting section 32. Accordingly, the picture element corresponding to the actuator element 14 is in the ON state.

The displacement-transmitting section 32 is provided to reflect the light transmitted through the back surface of the optical waveguide plate 12, and it is provided to increase the contact area with respect to the optical waveguide plate 12 to be not less than a predetermined size. That is, the light emission area is determined by the contact area between the displacement-transmitting section 32 and the optical waveguide plate 12.

In the display device D described above, the displacement-transmitting section 32 includes the plate member 32a for determining the substantial light emission area, and the displacement-transmitting member 32b for transmitting the displacement of the actuator element 14 to the plate member 32a.

It is preferable that portions other than the plate member 32a which makes contact with the optical waveguide plate 12 are covered with a black matrix. Especially, it is preferable to use, for example, a metal film such as those made of Cr, Al, Ni, and Ag as the black matrix, because of the following reason. That is, such a metal film absorbs a small amount of light, and hence it is possible to suppress attenuation and scattering of the light transmitted through the optical waveguide plate 12. Therefore, such a metal film is used especially preferably.

Next, when the voltage application to the pair of electrode 28a, 28b of the actuator element 14 is stopped to give the no-voltage-loaded state, the actuator element 14 intends to make restoration from the convex state to the original state (state indicated by Point B). However, due to the hysteresis characteristic, the actuator element 14 does not undergo complete restoration to the state of Point B, and it gives a state in which it is slightly displaced in the first direction from Point B (state indicated by Point H). In this state, the displacement-transmitting section 32 and the optical waveguide plate 12 are in a state in which only are separated from each other, i.e., in the OFF state.

Next, when the negative peak voltage (Vr) is applied between the pair of electrode 28a, 28b of the actuator element 14, then the slight displacement in the first direction in the no-voltage-loaded state is counteracted, and the actuator element 14 completely makes restoration to the original state.

Therefore, as understood from the bending displacement characteristic shown in FIG. 10, the positive peak voltage Vh can be defined as the operation voltage, and the negative peak voltage can be defined as the reset voltage. Explanation will be made below in conformity with this definition.

The actuator element 14 having the shape-retaining layer 26 has the following features.

(1) The threshold characteristic concerning the change from the OFF state to the ON state is steep as compared with the case in which no shape-retaining layer 26 exists. Accordingly, it is possible to narrow the deflection width of the voltage, and it is possible to mitigate the load on the circuit.

(2) The difference between the ON state and the OFF state is distinct, resulting in improvement in contrast.

(3) The dispersion of threshold value is decreased, and an enough margin is provided for the voltage setting range.

It is desirable to use, as the actuator element 14, an actuator element 14 which makes, for example, upward displacement (giving the separated state upon no voltage load and giving the contact state upon voltage application) because of easiness of control.

Next, explanation will be made for the respective constitutive components of the actuator element 14, especially for selection of materials for the respective constitutive components.

At first, it is preferable that the vibrating section 22 is composed of a highly heat-resistant material, because of the following reason. That is, when the actuator element 14 has a structure in which the vibrating section 22 is directly supported by the fixed section 24 without using any material such as an organic adhesive which is inferior in heat resistance, the vibrating section 22 is preferably composed of a highly heat-resistant material so that the vibrating section 22 is not deteriorated in quality at least during the formation of the shape-retaining layer 26.

It is preferable that the vibrating section 22 is composed of an electrically insulative material in order to electrically separate the vertical selection line 40 connected with the row electrode 28a of the pair of electrodes 28 formed on the substrate 18, from the signal line connected with the column electrode 28b.

Therefore, the vibrating section 22 may be composed of a material such as a highly heat-resistant metal and a porcelain enamel produced by coating a surface of such a metal with a ceramic material such as glass. However, the vibrating section 22 is optimally composed of a ceramic.

Those usable as the ceramic for constructing the vibrating section 22 include, for example, stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 22 is thin, high toughness, and small chemical reactivity with the shape-retaining layer 26 and the pair of electrodes 28. The term "stabilized zirconium oxide" includes stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 22, the stabilizer preferably comprises yttrium oxide. In this composition, yttrium oxide is contained preferably in an amount of 1.5 to 6 mole %, and more preferably 2 to 4 mole %. It is preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 22 is composed of a ceramic, a large number of crystal grains construct the vibrating section 22. In order to increase the mechanical strength of the vibrating section 22, the crystal grains preferably have an average grain diameter of 0.05 to 2 µm, and more preferably 0.1 to 1 µm.

The fixed section 24 preferably composed of a ceramic. The fixed section 24 may be composed of the same ceramic material as that used for the vibrating section 22, or the fixed section 24 may be composed of a ceramic material different from that used for the vibrating section 22. Those usable as the ceramic material for constructing the fixed section 24 include, for example, stabilized zirconium oxide, aluminum oxide, magnesium oxide, titanium oxide, spinel, mullite, aluminum nitride, silicon nitride, glass, and mixtures thereof, in the same manner as the material for the vibrating section 22.

Especially, those preferably adopted for the substrate 18 used in the display device according to the embodiment of the present invention include, for example, materials containing a major component of zirconium oxide, materials containing a major component of aluminum oxide, and materials containing a major component of a mixture thereof. Among them, those containing a major component of zirconium oxide are more preferable.

Clay or the like is added as a sintering aid in some cases. However, it is necessary to control components of the sintering aid in order not to contain an excessive amount of those liable to form glass such as silicon oxide and boron oxide because of the following reason. That is, although the materials which are liable to form glass are advantageous to join the substrate 18 to the shape-retaining layer 26, the materials facilitate the reaction between the substrate 18 and the shape-retaining layer 26, making it difficult to maintain a predetermined composition of the shape-retaining layer 26. As a result, the materials make a cause to deteriorate the element characteristics.

That is, it is preferable that silicon oxide or the like in the substrate 18 is restricted to have a weight ratio of not more than 3%, and more preferably not more than 1%. The term "major component" herein refers to a component which exists in a proportion of not less than 50% in weight ratio.

As described above, those usable as the shape-retaining layer 26 include piezoelectric/electrostrictive layers and anti-ferroelectric layers. However, when the piezoelectric/electrostrictive layer is used as the shape-retaining layer 26, it is possible to use, as the piezoelectric/electrostrictive layer, ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, or any combination of them.

It is needless to say that the major component contains the compound as described above in an amount of not less than 50% by weight. Among the ceramics described above, the ceramic containing lead zirconate is most frequently used as the constitutive material of the piezoelectric/electrostrictive layer for constructing the shape-retaining layer 26.

When the piezoelectric/electrostrictive layer is composed of a ceramic, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof. For example, it is preferable to use a ceramic containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 26, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and lead stannate.

Especially, when an anti-ferroelectric film, which contains a component comprising lead zirconate and lead stannate as represented by the following composition, is applied as a film-type element such as the actuator element 14, it is possible to perform driving at a relatively low voltage. Therefore, application of such an anti-ferroelectric film is especially preferred.

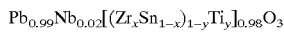

wherein, $0.5 < x < 0.6$, $0.05 < y < 0.063$, $0.01 < Nb < 0.03$

The anti-ferroelectric film may be porous. When the anti-ferroelectric film is porous, it is desirable that the porosity is not more than 30%.

It is preferable that the thickness of the vibrating section 22 of the substrate 18 have a dimension identical to that of the thickness of the shape-retaining layer 26 formed on the vibrating section 22, because of the following reason. That is, if the thickness of the vibrating section 22 is extremely thicker than the thickness of the shape-retaining layer 26 (if the former is different from the latter by not less than one figure), when the shape-retaining layer 26 makes shrinkage upon sintering, the vibrating section 22 behaves to inhibit the shrinkage. For this reason, the stress at the boundary surface between the shape-retaining layer 26 and the substrate 18 is increased, and consequently they are easily peeled off from each other. On the contrary, when the dimension of the thickness is in an identical degree between the both, it is easy for the substrate 18 (vibrating section 22) to follow the shrinkage of the shape-retaining layer 26 upon sintering. Accordingly, such dimension of the thickness is preferred to achieve integration. Specifically, the vibrating section 22 preferably has a thickness of 1 to 100 μm, more preferably 3 to 50 μm, and much more preferably 5 to 20 μm. On the other hand, the shape-retaining layer 26 preferably has a thickness of 5 to 100 μm, more preferably 5 to 50 μm, and much more preferably 5 to 30 μm.

The pair of electrodes 28 formed on the shape-retaining layer 26 are allowed to have an appropriate thickness depending on the use or application. However, the thickness is preferably 0.01 to 50 μm, and more preferably 0.1 to 5 μm. The pair of electrodes 28 are preferably composed of a conductive metal which is solid at room temperature. The metal includes, for example, metal simple substances or alloys containing, for example, aluminum, titanium, chromium, iron, cobalt, nickel, copper, zinc, niobium, molybdenum, ruthenium, rhodium, silver, stannum, tantalum, tungsten, iridium, platinum, gold, and lead. It is needless to say that these elements may be contained in an arbitrary combination.

The displacement-transmitting member 32b of the displacement-transmitting section 32 preferably has a hardness in a degree to directly transmit the displacement of the actuator element 14 to the optical waveguide plate 12. Therefore, those preferably used as materials for the displacement-transmitting member 32b include, for example, rubber, organic resins, organic adhesive films, and glass. However, it is allowable to use the electrode layer itself, or materials such as the piezoelectric materials and the ceramics described above. Those most preferably used include, for example, organic resins and organic adhesive films based on epoxy compounds, acrylic compounds, silicone compounds, and polyolefin compounds. Further, it is also effective to mix a filler with the foregoing compounds to suppress shrinkage upon curing.

Those desirably used as materials for the plate member 32a include the materials for the displacement-transmitting member 32b described above, as well as materials obtained by finely dispersing ceramic powder having a high refractive index, such as zirconia powder, titania powder, lead oxide powder, and mixed powder thereof, in an organic resin based on, for example, an epoxy, acrylic, or silicone compound, from viewpoints of light emission efficiency and maintenance of flatness. In this case, it is preferable to select a ratio of resin weight:ceramic powder weight=1:(0.1 to 10). Further, it is preferable to add, to the foregoing composition, glass powder having an average particle diameter of 0.5 to 10 μm in a ratio of 1:(0.1 to 1.0) with respect to the ceramic powder, because release property and contact property with respect to the surface of the optical waveguide plate 12 are improved.

Preferably, the flatness or the smoothness of the portion (surface) of the plate member 32a to contact with the optical waveguide plate 12 is sufficiently small as compared with the displacement amount of the actuator element 14, which is specifically not more than 1 μm, more preferably not more than 0.5 μm, and especially preferably not more than 0.1 μm. However, the flatness of the portion (surface) of the displacement-transmitting section 32 to contact with the optical waveguide plate 12 is important in order to reduce the clearance generated when the displacement-transmitting section 32 contacts with the optical waveguide plate 12. Accordingly, there is no limitation to the foregoing flatness range, provided that the contact portion makes deformation in a state of contact.

When the material described above is used for the displacement-transmitting section 32, the displacement-transmitting section 32 may be connected to the main actuator element 30 by stacking the displacement-transmitting section 32 composed of the material described above by using an adhesive, or by forming the displacement-transmitting section 32 on the upper portion of the main actuator element 30 or on the optical waveguide plate 12, in accordance with, for example, a method for coating a solution, a paste, or a slurry composed of the material described above.

When the displacement-transmitting section 32 is connected with the main actuator element 30, it is preferable to use a material for the displacement-transmitting member 32$b$ which also serves as an adhesive. Especially, in the case of the use of an organic adhesive film, it is also used as an adhesive by applying heat thereto. Therefore, the use of an organic adhesive film is preferred.

The optical waveguide plate 12 has an optical refractive index with which the light 10 introduced into the inside thereof is totally reflected by the front and back surfaces without being transmitted to the outside of the optical waveguide plate 12. It is necessary for the optical waveguide plate 12 to use those having a large and uniform light transmittance in the wavelength region of the light 10 to be introduced. The material for the optical waveguide plate 12 is not specifically limited provided that it satisfies the foregoing characteristic. However, specifically, those generally used for the optical waveguide plate 12 include, for example, glass, quartz, light-transmissive plastics such as acrylic plastics, light-transmissive ceramics, structural materials comprising a plurality of layers composed of materials having different refractive indexes, and those having a surface coating layer.

Figure 11:
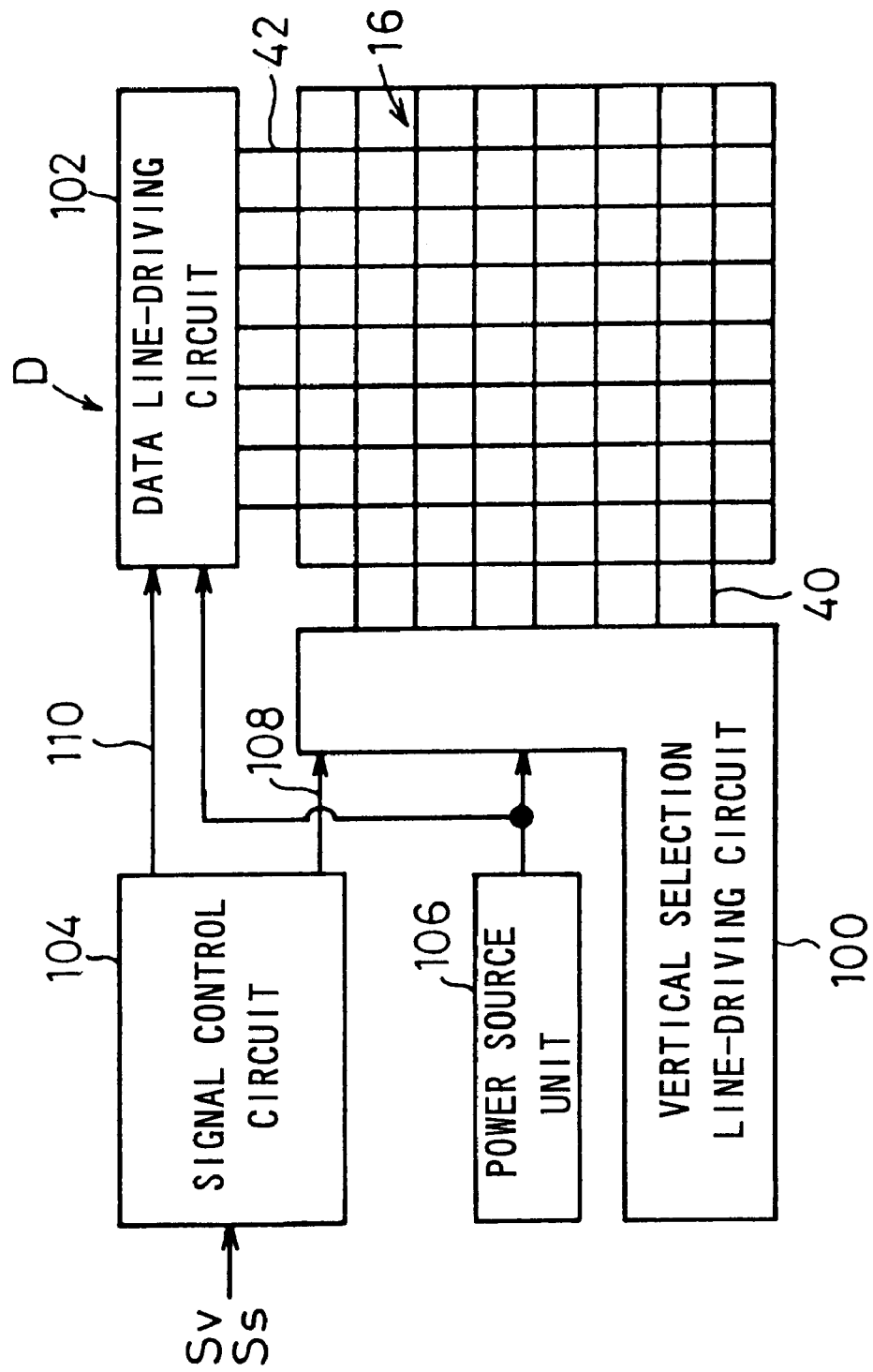
FIG. 11 shows an arrangement of peripheral circuits for the display device according to the embodiment of the present invention.

As shown in FIG. 11, the display device D according to this embodiment has its peripheral circuits comprising a vertical selection line-driving circuit 100 for selectively supplying a driving signal to the vertical selection lines 40 for the driving sections 16 comprising a large number of actuator elements 14 arranged in the matrix configuration or in the zigzag configuration so that the actuator elements 14 are successively selected in one row unit, a data signal-driving circuit 102 for outputting the data signal in parallel to the signal lines 42 for the driving sections 16 so that the data signal is supplied to the picture elements (actuator elements) 14 on the line (selected line) selected by the vertical selection line-driving circuit 100 respectively, and a signal control circuit 104 for controlling the vertical selection line-driving circuit 100 and the data line-driving circuit 102 on the basis of a picture image signal Sv and a synchronization signal Ss to be inputted.

Therefore, when one row is selected by the vertical selection line-driving circuit 100, and the data signal is outputted from the data line-driving circuit 102, then the voltage is applied to the respective picture elements concerning the selected line in accordance with their respective gradations.

A logic power source voltage for logical operation performed in an internal logic circuit, and two types of power source voltages for the vertical selection line are supplied to the vertical selection line-driving circuit 100 by the aid of a power source unit 106. The logic power source voltage and two types of power source voltages for the data line are supplied to the data line-driving circuit 62 by the aid of the power source unit 106 in the same manner as described above.

The signal control circuit 104 comprises, at its inside, a timing controller, a frame memory, and an I/O buffer, which is constructed such that the vertical selection line-driving circuit 100 and the data line-driving circuit 102 are subjected to gradational control on the basis of the voltage modulation system via a control line 108 communicating with the vertical selection line-driving circuit 100 and a control line 110 communicating with the data line-driving circuit 102.

It is desirable that the vertical selection line-driving circuit 100 and the data line-driving circuit 102 have the following features.

(1) The actuator element undergoes the capacitive load. Therefore, considering the fact that the capacitive load is subjected to the driving, for example, it is desirable that the partial voltage ratio, which is applied to the capacitive load, is not less than 50% at the time of completion of voltage (operation voltage) application for allowing the actuator element 14 to make the bending displacement.

(2) In order to obtain an displacement amount of the actuator element 14 which makes it possible to express the ON state and the OFF state of the picture element, it is desirable that an voltage output of not less than 20 V can be provided.

(3) It is desirable to consider the fact that the direction of the output current is recognized to be bidirectional.

(4) It is desirable that the load concerning the two-electrode structure in the row direction and the column direction can be subjected to the driving.

Two systems for the gradation control based on the voltage modulation system (first and second driving systems) will be explained with reference to FIGS. 12 to 19.

Figure 12:
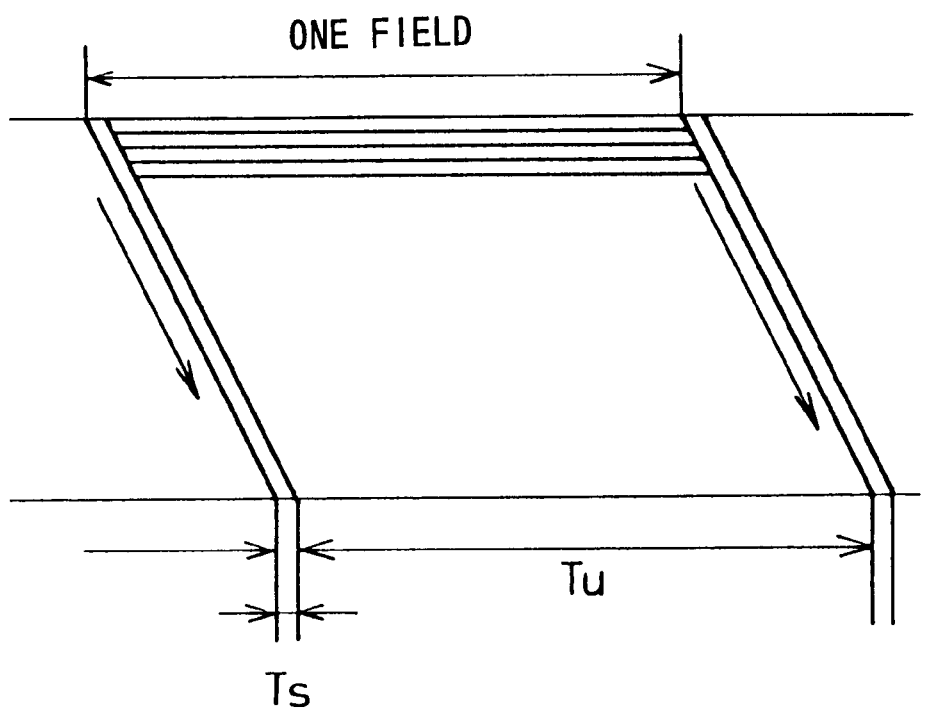
FIG. 12 shows a timing chart for explaining a first driving system for the display device according to the embodiment of the present invention.
Figure 13:
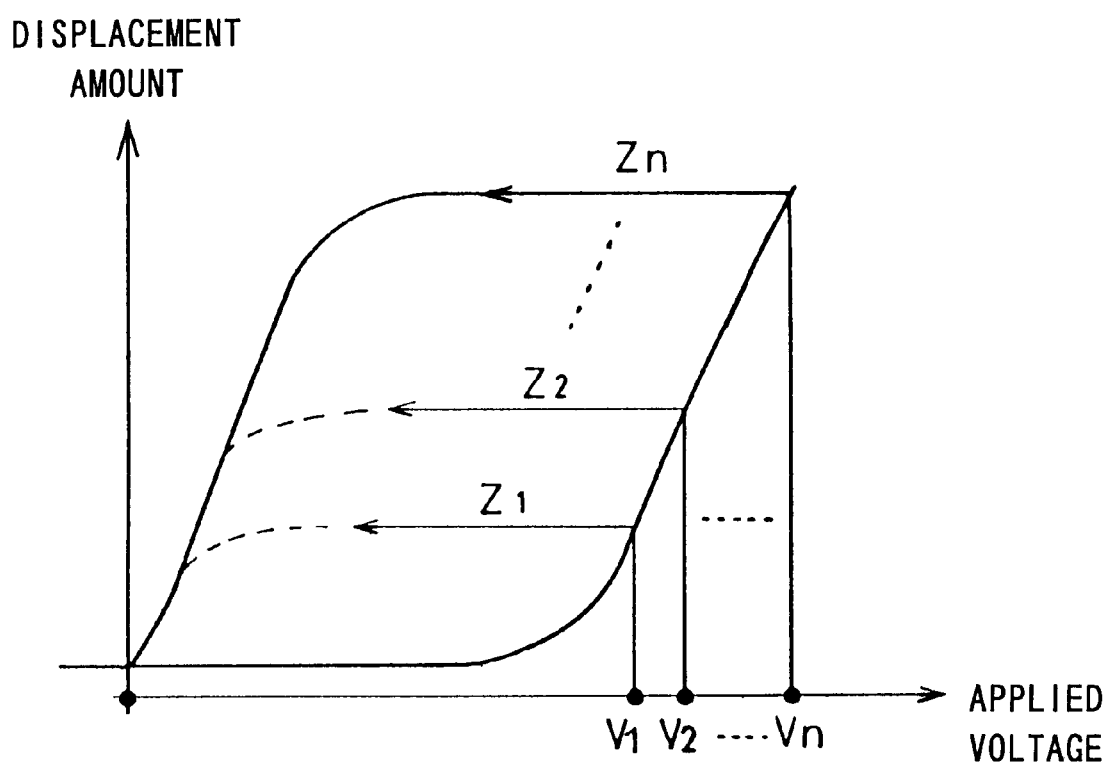
FIG. 13 shows a displacement characteristic of the actuator element for explaining gradation control based on the first driving system

At first, assuming that the display period for one image is one field as shown in FIG. 12, for example, the first driving system utilizes the fact that the actuator element 14 having the shape-retaining function makes displacement in an analog manner in accordance with the level of an applied voltage as shown in FIG. 13. In the first driving system, the voltage to be applied to the picture element is divided into a plurality of voltages (divided equally or divided arbitrarily) in accordance with the resolving power of the gradational expression, and the voltage in conformity with the gradation of the picture element is applied to the actuator element 14. Thus, it is possible to achieve the gradation control based on the voltage control system.

Specifically, for example, when one row is selected during the selection period Ts shown in FIG. 12 by using the vertical selection line-driving circuit 100 shown in FIG. 11, the voltages corresponding to the gradations of the respective actuator elements 14 are applied to a large number of the actuator elements 14 arranged on the selected line by the aid of the data line-driving circuit 102. The respective actuator elements 14 make displacement in the first direction in accordance with the levels of the applied voltages. In the case of an example shown in FIG. 13, the displacement is made linearly to give displacement amounts of $Z_1, Z_2, \ldots Z_n$ for voltages $V_1, V_2, \ldots V_n$ respectively.

Figure 14:
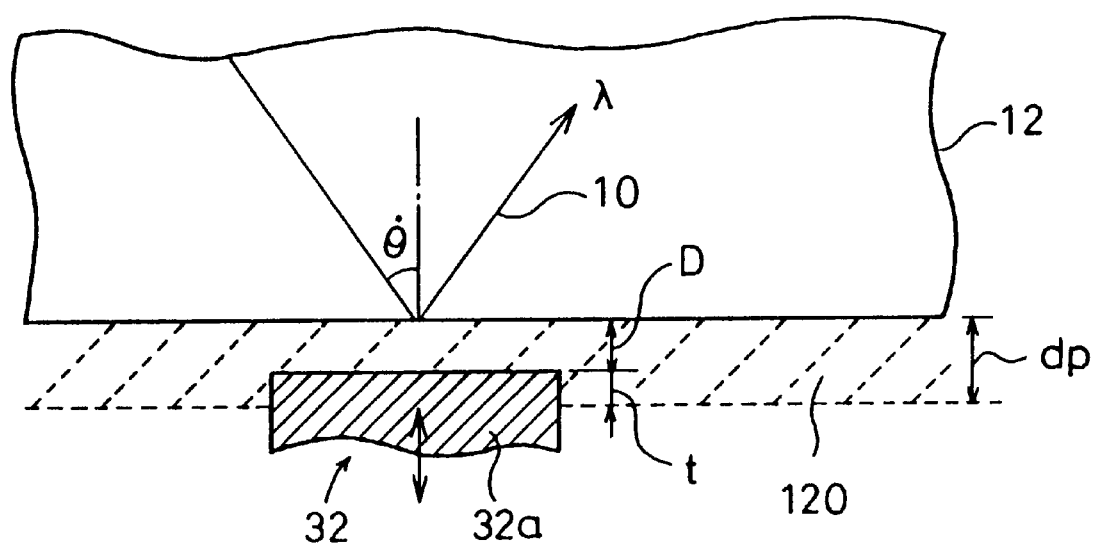
FIG. 14 illustrates the principle of gradation control based on the dot area and the contact property of the picture element and the evanescent effect.

For example, as shown in FIG. 14, at a point of time at which the actuator element 14 is displaced in a displacement amount of $Z_1$, the distance D between the first principal surface of the plate member 32$a$ of the displacement-transmitting section 32 and the back surface of the optical waveguide plate 12 becomes a distance corresponding to the wavelength $\lambda$ of the light 10 (the light 10 introduced into the optical waveguide plate 12). For example, at a point of time at which the actuator element 14 is displaced in a displacement amount of $Z_n$, ideally the first principal surface of the plate member 32$a$ completely contacts with the back surface of the optical waveguide plate 12.

When the displacement-transmitting section 32 approaches the back surface of the optical waveguide plate 12, and the distance between the first principal surface of the plate member 32$a$ of the displacement-transmitting section 32 and the back surface of the optical waveguide plate 12 is not more than the wavelength $\lambda$ of the light 10, then the amount of the scattered light radiated from the surface of the optical waveguide plate 12 is increased in accordance with the decrease in the distance, and thus the brightness level of the picture element corresponding to the actuator element 14 is increased.

This phenomenon can be explained in accordance with the following two bases. That is, at first, the first basis lies in the dot area and the contact property of the picture element. When the actuator element 14 makes displacement in the first direction, and the first principal surface of the plate member 32a of the displacement-transmitting section 32 approaches the back surface of the optical waveguide plate 12, then, in general, a part of the plate member 32a contacts with the back surface of the optical waveguide plate 12, and the contact portion between the plate member 32a and the optical waveguide plate 12 is increased in accordance with the increase in the displacement amount of the actuator element 14. The increase in the area of the contact portion brings about the increase in the amount of the light (scattered light) reflected by the surface of the plate member 32a, resulting in the increase in the brightness level of the picture element corresponding to the actuator element 14. On the contrary, when the displacement amount of the actuator element 14 is decreased, and the plate member 32a is separated from the optical waveguide plate 12, then the brightness level of the picture element is decreased depending on the width of separation D therebetween.

The second basis can be explained as follows in accordance with the evanescent effect. In general, as shown in FIG. 14, a region (evanescent region) 120, which is brought about on account of discharge of light (evanescent wave), exists, for example, around the back surface of the optical waveguide plate 12. The depth dp of the evanescent region 120 represents a depth at which the energy value of the evanescent wave is 1/e at the boundary between the optical waveguide plate 12 and the external space (the back surface of the optical waveguide plate 12 in this embodiment). The depth dp is given by the following expression (1). The energy E of the evanescent wave is given by the following expression (2).

$$dp = \lambda / [2\pi n_1 \sqrt{\{\sin^2\theta - (n_2/n_1)^2\}}] \quad (1)$$

$$E = \exp\{-(D/dp)\} \quad (2)$$

In the expression, $\lambda$ represents the wavelength of the light 10, and $\theta$ represents the angle (angle of incidence) at which the light 10 comes from the optical waveguide plate 12 into the external space as shown in FIG. 14. Further, $n_1$ represents the optical refractive index of the optical waveguide plate 12, and $n_2$ represents the optical refractive index of the external space.

According to the expression (1), it can be postulated that the depth dp is increased as the wavelength $\lambda$ of the light 10 is increased, and the depth dp is increased as the angle of incidence $\theta$ approaches the critical angle. As shown in the expression (2), the energy E of the evanescent wave is increased as the object approaches the back surface of the optical waveguide plate 12, and the energy E is attenuated exponentially as the object is separated from the back surface of the optical waveguide plate 12. The amount of light (scattered light 70) reflected by the surface of the plate member 32a of the displacement-transmitting section 32 is proportional to the energy E of the evanescent wave. Accordingly, the amount of scattered light 70 is increased as the plate member 32a approaches the back surface of the optical waveguide plate 12, and the amount of light 70 is decreased exponentially as the plate member 32a is separated from the back surface of the optical waveguide plate 12.

During the NO selection period Tu ranging from the point of time of completion of the selection period Ts to the point of time of application of the reset pulse Pr, the actuator element 14 continues to retain the displacement amount determined upon the completion of the selection period over the NO selection period Tu, owing to the shape-retaining effect exerted by the shape-retaining layer 26 of the actuator element 14. Accordingly, the light emission state of the picture element is maintained for a certain period of time.

Next, the second driving system will be explained with reference to FIGS. 15 to 19. In the second driving system, the time control differs depending on whether a still image is displayed on the surface of the optical waveguide plate 12, or an animation image is displayed thereon.

Figure 15A:
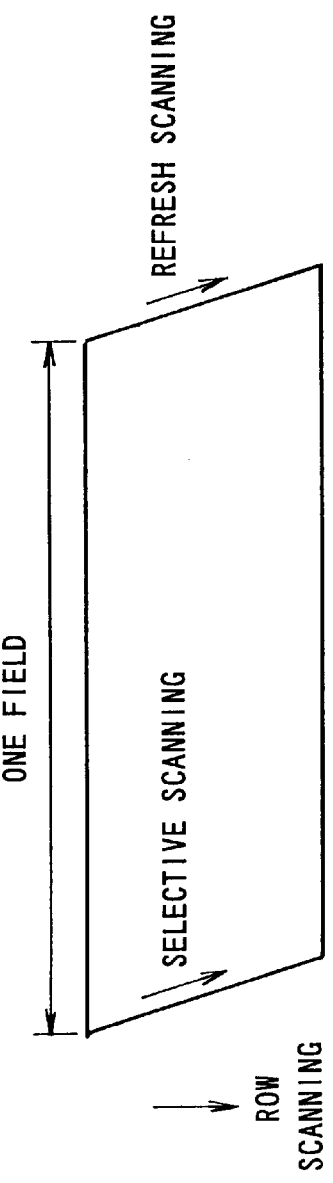
FIG. 15A shows a timing chart illustrating a period (one field) for displaying one image of an animation image.
Figure 15B:
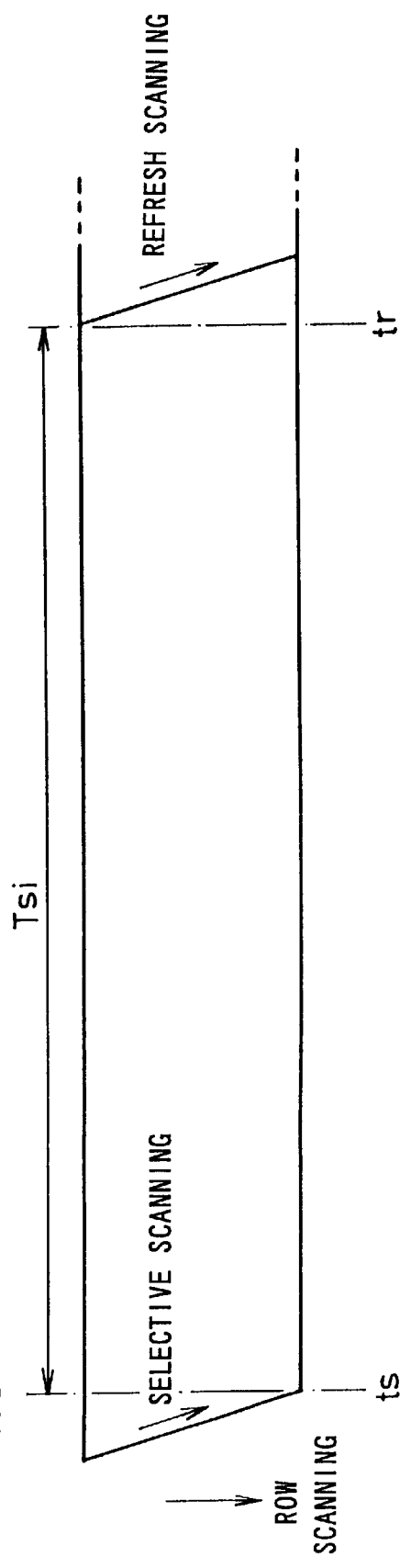
FIG. 15B shows a timing chart for explaining the minimum still image display period.

Specifically, when a still image is displayed, it is assumed that the period for displaying one image included in the animation image is one field as shown in FIG. 15A. As shown in FIG. 15B, the minimum display period Tsi of the still image (minimum still image display term) is set as a period which is fairly longer than the one field. The minimum still image display period Tsi corresponds to the period ranging from the point of time ts to start display of one image to the point of time tr to perform refresh, which is determined by the structure of the display device (for example, CRT, liquid crystal display, and plasma display). For example, in the case of CRT having no memory function, one field is set in the same manner as the case of display of the animation image. In the case of the liquid crystal display and the plasma display, the minimum still image display period Tsi is set while considering the discharge time of the liquid crystal and the plasma.

Unlike CRT, the liquid crystal display and the plasma display have the memory function. Therefore, in general, the minimum still image display period Tsi is set as a period which is longer than one field.

Figure 16A:
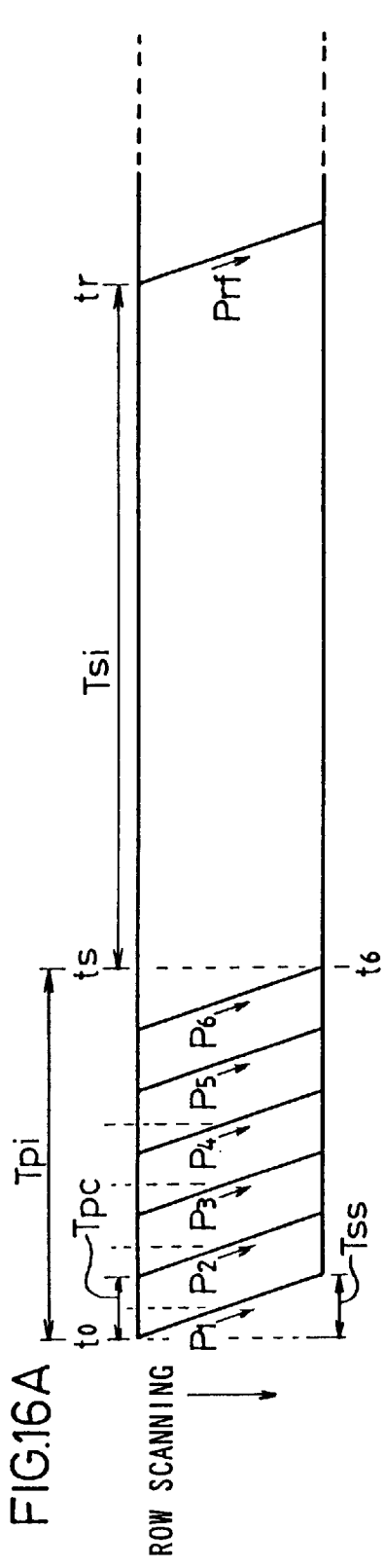
FIG. 16A shows a timing chart illustrating an example in which a driving signal is supplied in one row unit to a picture element group included in a certain column.
Figure 16B:
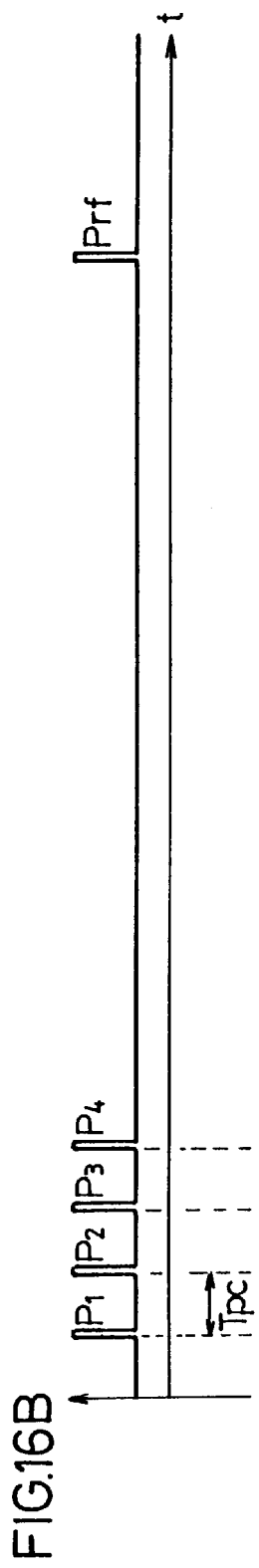
FIG. 16B shows a waveform concerning a case in which the driving signal is supplied to the actuator element (picture element) on an arbitrary row included in the column.
Figure 16C:
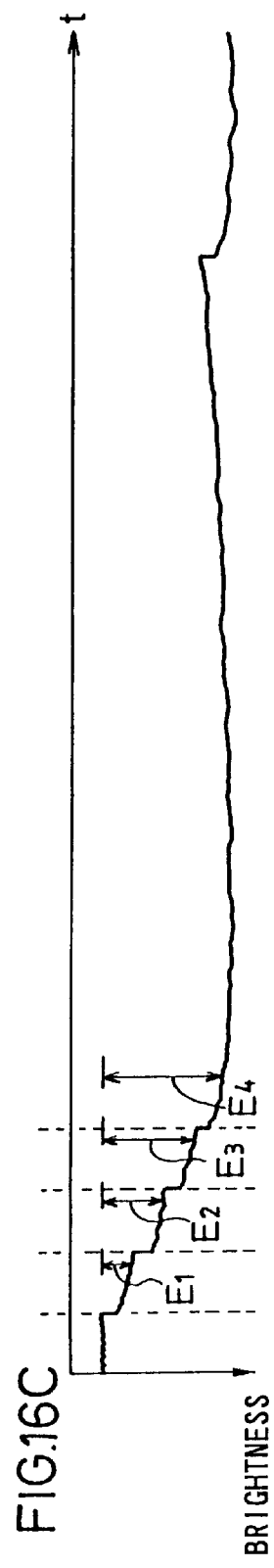
FIG. 16C shows the change in display brightness obtained when the driving signal is supplied.

As shown in FIGS. 16A to 16C, in the second driving system for the display device D according to the embodiment of the present invention, a driving signal, which has one or more minute pulses P1 to P6, is supplied, at the point of time t0 to start row scanning, to the respective actuator elements 14 corresponding to the group of picture elements selected by the vertical selection line-driving circuit 100, by the aid of the data line-driving circuit 102. FIG. 16A shows a timing chart illustrating an example in which the driving signal is supplied in one row unit to the picture element group included in a certain column. FIG. 16B shows a waveform used when the driving signal is supplied to the actuator element (picture element) 14 in an arbitrary row included in the column. FIG. 16C shows the change in display brightness obtained when the driving signal is supplied. This embodiment represents, for example, a case in which display is performed with gradation levels of 4 (P1 to P4) while the maximum gradations are 6 (minute pulses P1 to P6).

As also understood from FIG. 16B, the driving signal includes minute pulses of a number corresponding to gradation levels to be displayed by the picture element. The pulse cycle Tpc is designed as a period which is equal to the period (minute pulse scanning period) Tss for selecting all rows (first row to nth row) by using the vertical selection line-driving circuit 100, or which is shorter than the minute pulse scanning period Tss. Of course, the pulse cycle Tpc may be set to be longer than the minute pulse scanning period Tss. In the examples shown in FIGS. 16A and 16B, the pulse cycle Tpc of the minute pulse is set to be identical with the minute pulse scanning period Tss.

In this embodiment, the minute pulse, which has an extremely short pulse width, is used as the pulse signal applied to the actuator element 14. Therefore, each of the minute pulse scanning periods (Tss) is extremely short. The period (minute pulse application period) Tpi, which ranges from the point of time t0 to start scanning to the point of time t6 (=ts) of completion of the scanning period (Tss) of the minute pulse P6 corresponding to the maximum gradation 6, is also extremely short as compared with the minimum still image display period Tsi.

Figure 17A:
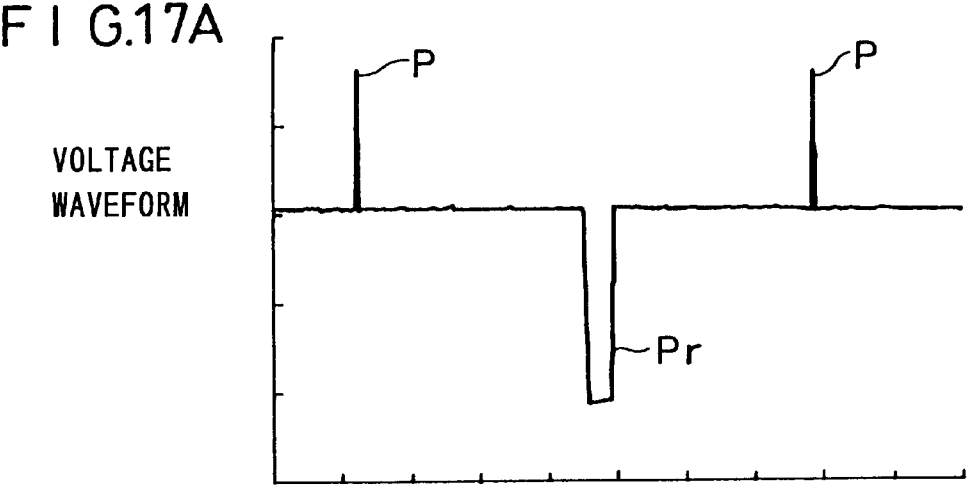
FIG. 17A shows a waveform illustrating the applied voltage and the timing of application for the minute pulse and the reset pulse, based on a second driving system.
Figure 17B:
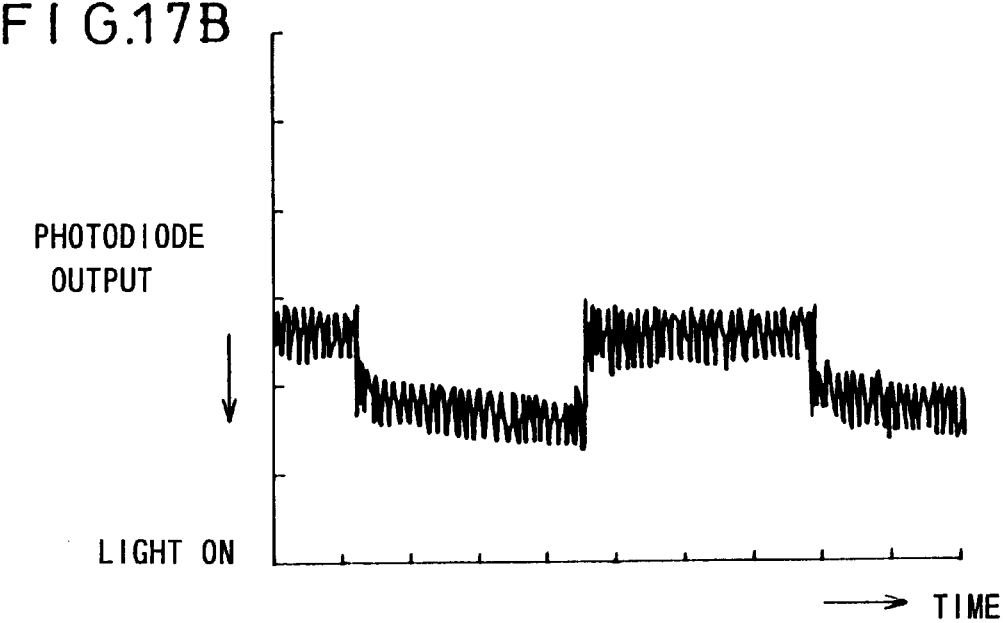
FIG. 17B shows a distribution of light emission intensity obtained when the voltage shown in FIG. 17A is applied.

When one minute pulse is applied to the actuator element 14, the actuator element 14 makes displacement in the first direction in an amount corresponding to the energy (electric power) of the pulse. This phenomenon is shown in FIG. 17. FIG. 17 is obtained by observing the output intensity of a photodiode provided at a portion corresponding to a measurement objective actuator element 14 on the surface of the optical waveguide plate 12, while applying various voltages to the actuator element 14.

As understood from FIG. 17, the picture element corresponding to the actuator element 14 emits light at the point of time at which the minute pulse P having a peak value of 130 V is applied to the actuator element 14. Further, the picture element is quenched at the point of time at which the reset pulse Pr having a peak value of –50 V is applied.

Figure 18:
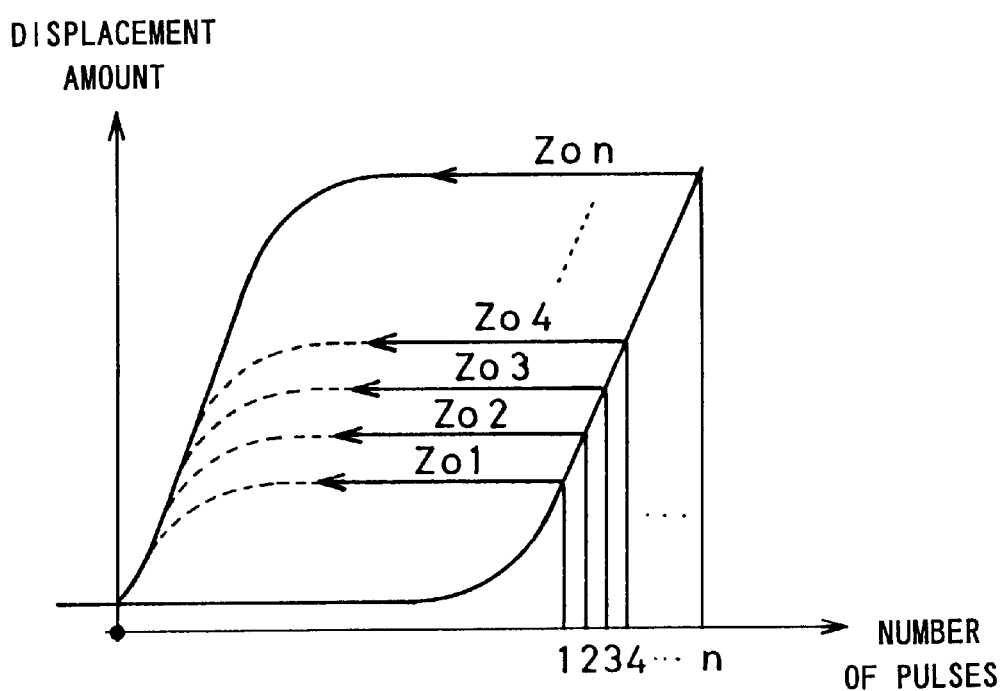
FIG. 18 shows characteristic curves illustrating the change in displacement amount (offset amount) of the actuator element with respect to the number of minute pulses.

As described above, the actuator element 14 makes displacement in the amount corresponding to the electric power of the minute pulse P. Accordingly, as shown in FIG. 18, when the displacement amount of the actuator element 14 caused by application of one minute pulse P1 is defined as one offset amount Zo1, the actuator element 14 makes displacement in an amount of 2 offset amounts Zo2 in accordance with application of two minute pulses P1 and P2. The actuator element 14 makes displacement in an amount of 3 offset amounts Zo3 in accordance with application of three minute pulses P1 to P3. The actuator element 14 makes displacement in an amount of 4 offset amounts Zo4 in accordance with application of four minute pulses P1 to P4. In general, the actuator element 14 makes displacement in an amount of n offset amounts Zon in accordance with application of n individuals of minute pulses P1 to Pn.

In this embodiment, as described above, the contact area of the plate member 32 with respect to the back surface of the optical waveguide plate 12 is increased in accordance with the increase in the displacement amount of the actuator element 14. In other words, as shown in FIG. 14, the entering amount t into the evanescent region 120 existing around the back surface of the optical waveguide plate 12 is increased in accordance with the increase in the displacement amount of the actuator element 14. Accordingly, as shown in FIG. 16C, the display brightness of the picture element corresponding to the actuator element 14 is also increased from E1 to E4. That is, the gradation of the picture element is controlled by the number of the minute pulses P.

At the stage at which the minute pulse application period Tpi (see FIG. 16A) has passed, the actuator element 14 continues to retain the displacement amount determined upon completion of the minute pulse application period Tpi, owing to the shape-retaining effect exerted by the shape-retaining layer 26 of the actuator element 14. Thus, the light emission state of the picture element is maintained for a certain period of time.

When a still image is displayed on the surface of the optical waveguide plate 12, one minute pulse (refresh pulse) Prf is applied to the actuator element 14 before the passage of a certain period after completion of the minute pulse application period Tpi, i.e., before the decrease of the displacement amount of the actuator element 14. This operation is successively performed for all of the actuator elements 14.

Owing to the application of the refresh pulse Prf to the actuator element 14, the displacement amount of each of the actuator elements 14 is restored to the displacement amount obtained upon the point of time of completion of the minute pulse application period Tpi. The displacement of the actuator element 14 is further maintained for a certain period. The still image is displayed on the surface of the optical waveguide plate 12 by successively repeating the foregoing operation.

When a still image is displayed in accordance with the first driving system explained on the basis of FIGS. 11 and 12, for example, as shown in FIG. 15B, the refresh voltage subjected to analog adjustment in conformity with the display image may be applied to each of the actuator elements 14 by the aid of the data line-driving circuit 102 upon the time of completion of the minimum still image display period Tsi.

Figure 19:
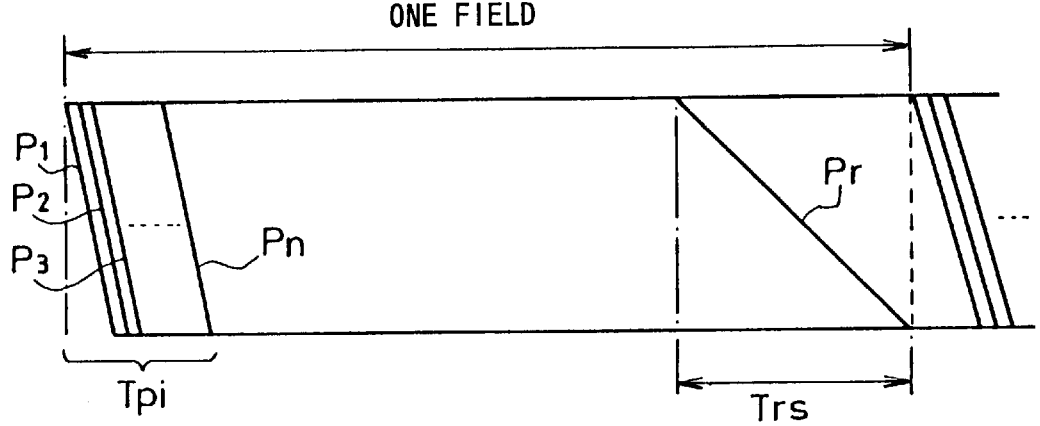
FIG. 19 shows a timing chart concerning a case in which an animation image is displayed in accordance with the second driving system.

Next, explanation will be made for the display of an animation image on the surface of the optical waveguide plate 12 in accordance with the second driving method. When the animation image is displayed, the procedure is basically the same as that used for the display of the still image described above. However, as shown in FIG. 19, the former is different from the latter in that assuming that the period for displaying one image is one field, a reset pulse Pr, which has a voltage sufficient to reset the displacement of the actuator element 14, is applied upon completion of each field by the aid of the data line-driving circuit 102.

In this embodiment, the minute pulse application period Tpi immediately ends. Therefore, the period (reset scanning period) Trs for applying the reset pulse Pr to all of the picture elements does not interfere with the minute pulse application period Tpi. The reset scanning period Trs can be set to be longer than the minute pulse application period Tpi. This results in successful prolongation of the time of application of the reset pulse Pr to each of the picture elements. Accordingly, it is possible to reliably rest the displacement of each of the picture elements.

As described above, in the second driving method, it is enough to apply the minute pulse signal to the actuator element 14 in the amount corresponding to its gradation. Accordingly, it is possible to perform extremely high speed row scanning, and it is possible to easily deal with high quality image display.

Especially, it is unnecessary to use any D/A converter for converting the digital data into the analog signal. Moreover, it is unnecessary to perform, for example, complicated voltage change and complicated voltage selection even when the range of the display gradation is wide. Therefore, it is possible to suppress the number of settings for the voltage use to the minimum, and it is possible to realize simplification of the arrangement of the peripheral circuit system (including the first and second driving circuits).

When the still image is displayed on the display surface of the optical waveguide plate 12, the displacement state of each of the actuator elements 14 is restored to the gradation level by periodically applying the refresh pulse Prf to each of the actuator elements 14. Therefore, the display of the still image can be maintained for a period not shorter than the minimum still image display period Tsi. Accordingly, the display device of the present invention is preferably used for a so-called electronic poster or the like which is one of application examples of the still image display. This is also true when the still image is displayed in accordance with the first driving system.

When the animation image is displayed on the display surface of the optical waveguide plate 12, only the following operation is performed. That is, the minute pulse signal is applied in the number of times corresponding to the gradation at the point of time t0 to start one field, and the reset pulse Pr is applied at the point of time of completion of the one field. It is unnecessary to apply the voltage or the like to the actuator element 14 during the foregoing period. Therefore, it is possible to greatly reduce the electric power consumption required to drive the actuator element 14. Moreover, it is possible to provide enough time for the signal processing. As a result, the display device of the present invention can easily deal with evolution to more high speed processing, for example, display of high-definition television images and display of computer graphic images.

The maximum gradation is 6 in the embodiment described above, however, the maximum gradation may be not less than 7. In the case of a constant pulse width and a constant amplitude, the minute pulse application period Tpi is prolonged in accordance with the number of the maximum gradations. Therefore, there is a likelihood that the animation image display suffers from shortage of brightness. For this reason, it is preferable that the pulse width and/or the amplitude of each of the minute pulse signals is set in consideration of the maximum display gradations and the allowable minute pulse application period Tpi.

As described above, the depth dp of the evanescent region 120 is increased as the wavelength λ of the light 10 is increased, and the depth dp is increased as the angle of incidence θ of the light 10 with respect to the optical waveguide plate 12 approaches the critical angle. Therefore, when it is assumed that the red, green, and blue light fluxes are introduced from the light source 200 to the optical waveguide plate 12, the depth dp of the evanescent region 120 and the energy distribution of the evanescent wave differ for each of the light fluxes, because the respective light fluxes have different wavelengths.

Accordingly, the displacement amount (one offset amount Zo1) of the actuator element 14, which is brought about by application of one minute pulse, can be arbitrarily adjusted separately for R/G/B by setting the pulse width and the amplitude of the minute pulse P separately for R/G/B. Thus, it is possible to easily improve the brightness and improve the contrast.

The angle of incidence θ of the light with respect to the optical waveguide plate 12 may be set depending on the wavelength λ of the light introduced into the optical waveguide plate 12. For example, the position of the light source 200 is deviated separately for R/G/B, or three types of light sources 200 are installed corresponding to R/G/B. Accordingly, it is possible to obtain an approximately identical energy distribution of the evanescent wave for the respective light fluxes (R/G/B), and it is possible to effectively correct dispersion of the brightness among the respective light fluxes (R/G/B).

Changeover of R/G/B can be realized by utilizing a mechanical shutter or an ON/OFF switch for the RGB light source such as hot cathode tubes, cold cathode tubes, light emitting diodes, and lasers. Alternatively, changeover of R/G/B can be realized by using, for example, three primary color filters, complementary color filters, opaque members obtained, for example, by dispersing a coloring matter such as a pigment in a resin or the like, and fluorescent members in combination.

When the light 10, which is radiated from the light source 200 to be introduced into the optical waveguide plate 12, is visible light, there is a likelihood that scattered light may be produced due to defects (for example, flaws and foreign matters) in the optical waveguide plate 12, sometimes resulting in deterioration of contrast.

In the display device D according to the embodiment described above, the image is displayed by controlling the displacement action of each of the actuator elements 14 in the direction to make contact or separation with respect to the optical waveguide plate 12 so that the leakage light 70 is controlled at the predetermined position of the optical waveguide plate 12. However, if the contact of the picture element is incomplete, there is a likelihood that the display brightness is decreased. In order to solve this problem, it is conceived that the displacement-transmitting section 32 is constructed by using a flexible material. However, another problem arises in that such a system is disadvantageous in response performance.

Figure 20:
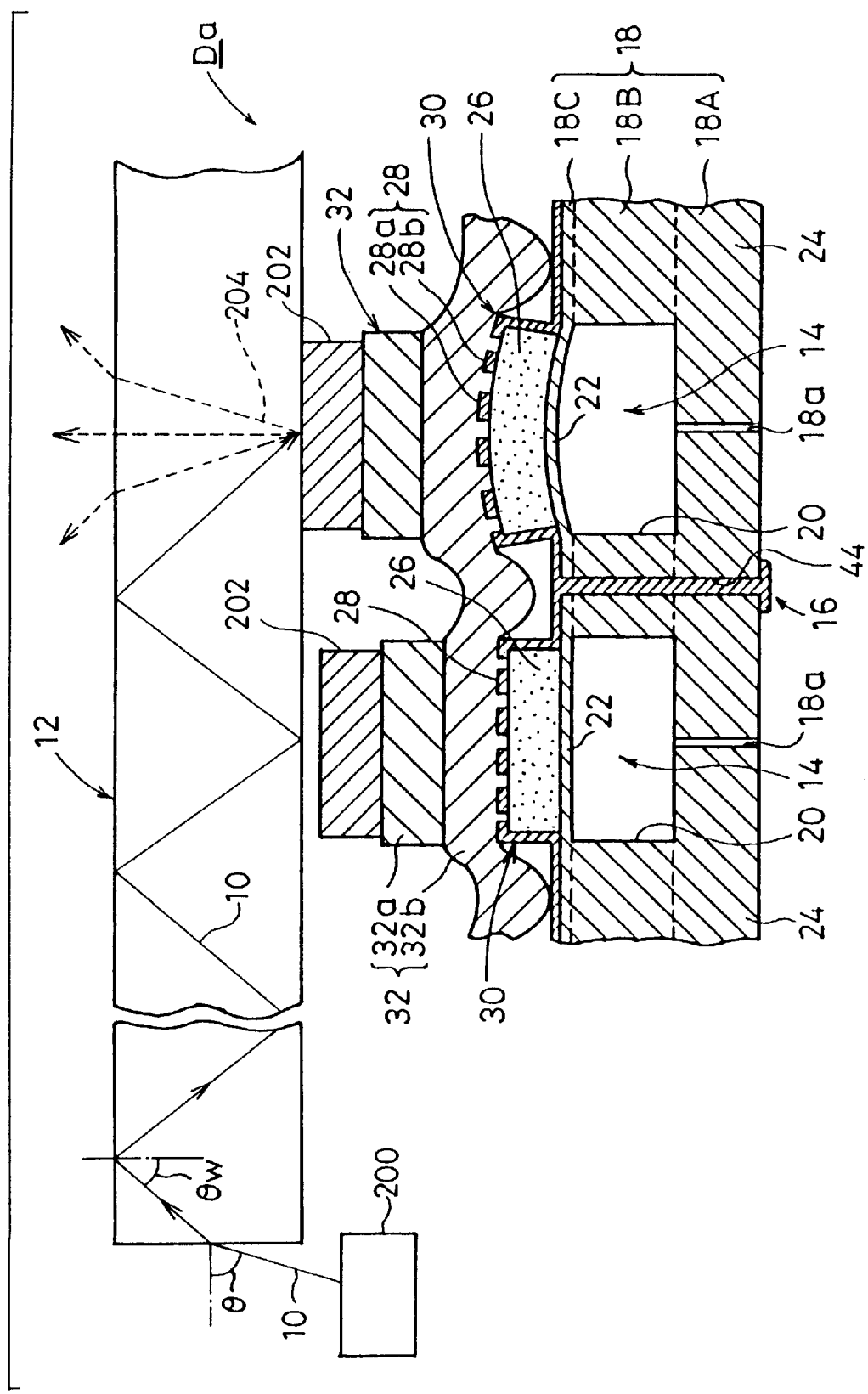
FIG. 20 shows a cross-sectional arrangement illustrating a first modified embodiment of the display device according to the embodiment of the present invention.
Figure 21:
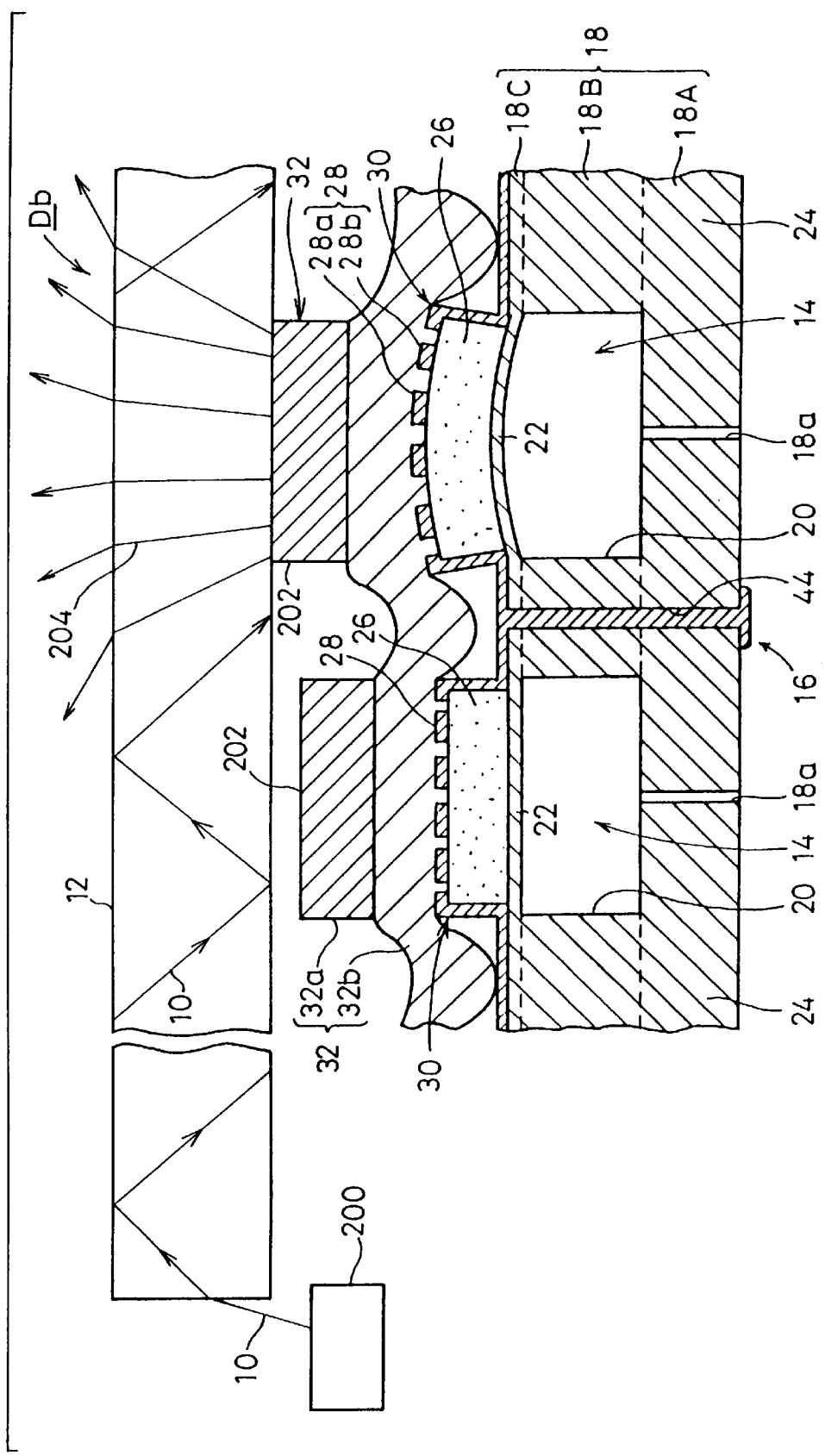
FIG. 21 shows a cross-sectional arrangement illustrating a second modified embodiment of the display device according to the embodiment of the present invention.

As shown in FIGS. 20 and 21, in the modified embodiments Da and Db described below, of the display device according to the embodiment of the present invention, invisible light is used as the light 10 which is radiated from the light source 200 to be introduced into the optical waveguide plate 12. The picture element is formed with a fluorescent element (fluorescent layer 202 in the embodiments shown in FIGS. 20 and 21) which is excited by the invisible light 10 to emit predetermined visible light 204.

The display device Da according to the first modified embodiment shown in FIG. 20 represents a case in which the fluorescent layer 202 is formed on the upper surface of the plate member 32a of the displacement-transmitting section 32. The display device Db according to the second modified embodiment shown in FIG. 21 represents a case in which the fluorescent layer 202 is formed in place of the plate member 32a. Those usable as the invisible light 10 include ultraviolet light and infrared light, however, any of them may be used. The arrangement of the other components or parts is the same as that of the display device D according to the embodiment of the present invention shown in FIG. 1, detailed explanation of which will be omitted.

Specified examples of the display devices Da and Db according to the first and second modified embodiments will be described. For example, an infrared light source can be used as the light source 200, and a fluorescent element based on infrared light excitation can be used as the light-emitting element (the fluorescent layer 202 in the embodiments shown in FIGS. 20 and 21) formed on the picture element. In such an arrangement, there is no special limitation for the infrared light-excited fluorescent element. Those usable as the infrared light-excited fluorescent element include, for example, those based on the use of the infrared stimulation effect, the quantum counting function, and the multi-stage energy transfer.

In the display devices Da and Db, a stimulus fluorescent element can be used while using the infrared light and the stimulation exciting light source in combination. When color display is performed, three kinds of fluorescent materials, which exhibit red, green, and blue light emissions as three primary colors of light respectively, can be used to arrange them in a two-dimensional pattern so that an image is formed.

The light source 200 is not specifically limited, provided that it includes the light having a wavelength necessary to excite the fluorescent element, and it has an energy density sufficient for excitation. Those preferably used for the infrared exciting fluorescent element include, for example, infrared lasers and halogen lamps.

As described above, in the display devices Da and Db according to the first and second modified embodiments, the invisible light is used as the light 10 to be introduced into the optical waveguide plate 12. Accordingly, visible light emission, which would be otherwise caused by those other than light emission brought about by the picture element, completely disappears in the optical waveguide plate 12. Therefore, the display devices Da and Db are advantageous to improve the contrast.

Further, the depth dp of the effective evanescent region 120 (see FIG. 14) can be made large by adjusting the energy density, the wavelength, and the angle of incidence of the invisible light 10 radiated from the light source 200. Therefore, it is possible to perform display having large brightness even when the contact of the picture element is incomplete.

In these embodiments, the design in which the contact property of the picture element is considered (the design based on the use of flexible materials) can be improved into a design in which the rigidity is high and the importance is attached to response performance. Such a design leads to realization of a high speed for row scanning, making it extremely easy to realize high quality image display.

As for the modulation system for the gradation control, it is possible to apply all of the voltage modulation systems and the time modulation systems as described above. Especially, when the voltage modulation system is used, the depth dp of the effective evanescent region 120 is increased, which is advantageous to achieve multi-stage gradation.

Especially, as shown in FIG. 20, for example, it is assumed that the angle of incidence of the invisible light 10 from the light source 200 to the side surface of the optical waveguide plate 12 is θ, and the angle of incidence with respect to air obtained when the invisible light 10 arrives at the surface of the optical waveguide plate 12 is θW. The advantage is increased as the energy density is increased, as the wavelength is increased, and as the angle of incidence θ is increased (provided that it is an essential condition that the angle of incidence θW is larger than the critical angle).

It is a matter of course that the display device according to this invention is not limited to the embodiments described above, which may adopt other various forms without deviating from the gist or essential characteristics of this invention.

As described above, according to the display device of the present invention, the time required to perform row scanning can be shortened drastically, and it is possible to easily deal with the high quality image display. Further, it is unnecessary to perform, for example, complicated voltage change and voltage selection even when the range of display gradation is widened, it is possible to restrain the number of settings of the use of voltage to the minimum, and it is possible to realize a simplified arrangement of the peripheral circuit system (including the driving circuit).

It is possible to exhibit the function as the display by utilizing, at the maximum, the memory function of the shape-retaining layer (the piezoelectric/electrostrictive layer and the anti-ferroelectric layer) of the actuator element for constructing the picture element, and it is possible to realize stabilization of light emission and stabilization of display brightness (gradation). Moreover, the selection period for the picture element is minimized to make it possible to effectively reduce electric power consumption.

What is claimed is:

1. A display device comprising:
    an optical waveguide plate for receiving light from a light source, said waveguide plate having first and second principal surfaces opposed to one another, the refractive index of said waveguide plate being selected to reflect internally substantially all of the light introduced therein, said waveguide plate having an evanescent region adjacent said first principal surface; and
    a driving section comprising a plurality of actuators facing said first principal surface of said waveguide plate, each of a plurality of said actuators having at least two displacement positions within the evanescent region, said displacement positions determining the gradation of images displayed on said second principal surface of said waveguide plate.

2. The display device according to claim 1, wherein said actuator elements have a number corresponding to a large number of picture elements, wherein:
    a picture image corresponding to an image signal is displayed on said optical waveguide plate, by controlling leakage light at a predetermined portion of said optical waveguide plate by controlling displacement action of each of said actuator elements in a direction to make contact or separation with respect to said optical waveguide plate in accordance with an attribute of said image signal to be inputted.

3. The display device according to claim 2, wherein:
    each said actuator element comprises a shape-retaining layer, an operating section having at least a pair of electrodes formed on said shape-retaining layer, a vibrating section for supporting said operating section, and a fixed section for supporting said vibrating section in a vibrating manner; said display device further comprising:
    a displacement-transmitting section for transmitting said displacement action of said actuator element to said optical waveguide plate, said displacement action being generated by voltage application to said pair of electrodes.

4. The display device according to claim 1, further comprising:
    a first driving circuit for selecting actuator elements at least in one row unit, a second driving circuit for outputting display information for a selected row, and a signal control circuit for controlling said first and second driving circuits, wherein:
    said signal control circuit controls said first and second driving circuits so that gradation is controlled at least by means of a voltage modulation system.

5. The display device according to claim 4, wherein said signal control circuit analog-controls a voltage which is applied by the aid of said second driving circuit depending on display gradation, upon selection for said actuator element.

6. The display device according to claim 4, wherein when a still image is displayed on said second principal surface of said optical waveguide plate, a refresh voltage, which is subjected to analog adjustment in accordance with a display image, is applied to each of said actuator elements by the aid of said second driving circuit upon completion of a minimum still image display period.

7. The display device according to claim 4, wherein upon selection for said actuator element, said signal control circuit changes a number of times of application of minute pulse signals applied by the aid of said second driving circuit in accordance with display gradation.

8. The display device according to claim 7, wherein a pulse width and/or an amplitude of said minute pulse signal is set while considering maximum display gradation.

9. The display device according to claim 7, wherein a pulse width and/or an amplitude of said minute pulse signal is set depending on a wavelength of said light introduced into said optical waveguide plate.

10. The display device according to claim 4, wherein an angle of incidence of said light with respect to said optical waveguide plate is set depending on a wavelength of said light introduced into said optical waveguide plate.

11. The display device according to claim 7, wherein when a still image is displayed on said second principal surface of said optical waveguide plate, a refresh pulse comprising at least one of said minute pulse signals is applied to each of said actuator elements by the aid of said second driving circuit upon completion of a minimum still image display period.

12. The display device according to claim 4, wherein when an animation image is displayed on said second principal surface of said optical waveguide plate, assuming that a period to display one image included in said animation image is one field, a reset voltage, which is sufficient to reset displacement of said actuator element, is applied by the aid of said second driving circuit upon completion of each field.

13. A display device comprising:
an optical waveguide plate for receiving light from a light source, said waveguide plate having first and second principal surfaces opposed to one another, the refractive index of said waveguide plate being selected to reflect internally substantially all of the light introduced therein, said waveguide plate having an evanescent region adjacent said first principal surface;
a plurality of actuators facing said first principal surface of said waveguide plate, each of a plurality of said actuators having at least two displacement positions within the evanescent region;
means for controlling each actuator to assume at least one of said two displacement positions to in turn control gradation of images displayed on said second principal surface of said waveguide plate.

14. The display device according to claim 13, further comprising:
a first driving circuit for selecting at least one actuator element at least in one row unit, a second driving circuit for outputting display information for a selected row, and a signal control circuit for controlling said first and second driving circuits, wherein:
said signal control circuit controls said first and second driving circuits so that gradation is controlled at least by means of a voltage modulation system.

15. The display device according to claim 14, wherein said signal control circuit analog-controls a voltage which is applied by the aid of said second driving circuit depending on display gradation, upon selection for said of least one actuator element.

16. The display device according to claim 14, wherein when a still image is displayed on a display surface of said optical waveguide plate, a refresh voltage, which is subjected to analog adjustment in accordance with a display image, is applied to at least one said actuator element by the aid of said second driving circuit upon completion of a minimum still image display period.

17. The display device according to claim 14, wherein upon selection to said actuator element, said signal control circuit changes a number of times of application of minute pulse signals applied by the aid of said second driving circuit in accordance with display gradation.

18. The display device according to claim 17, wherein a pulse width and/or an amplitude of said minute pulse signal is set while considering maximum display gradation.

19. The display device according to claim 17, wherein a pulse width and/or an amplitude of said minute pulse signal is set depending on a wavelength of said light introduced into said optical waveguide plate.

20. The display device according to claim 14, wherein an angle of incidence of said light with respect to said optical waveguide plate is set depending on a wavelength of said light introduced into said optical waveguide plate.

21. The display device according to claim 17, wherein when a still image is displayed on a display surface of said optical waveguide plate, a refresh pulse comprising at least one of said minute pulse signals is applied to said at least one actuator element by the aid of said second driving circuit upon completion of a minimum still image display period.

22. The display device according to claim 14, wherein when an animation image is displayed on a display surface of said optical waveguide plate, assuming that a period to display one image included in said animation image is one field, a reset voltage, which is sufficient to reset displacement of said at least one actuator element, is applied by the aid of said second driving circuit upon completion of each field.

* * * * *